United States Patent
Jam et al.

(10) Patent No.: US 11,652,524 B2
(45) Date of Patent: May 16, 2023

(54) ANTENNA SYSTEM FOR A MULTI-BEAM BEAMFORMING FRONT-END WIRELESS TRANSCEIVER

(71) Applicant: SkyGig, LLC, Ann Arbor, MI (US)

(72) Inventors: Armin Jam, Ann Arbor, MI (US); Avish Koochak Kosari, Ann Arbor, MI (US)

(73) Assignee: SkyGig, LLC, Ann Arbor, MI (US)

(*) Notice: Subject to any disclaimer, the term of this patent is extended or adjusted under 35 U.S.C. 154(b) by 0 days.

(21) Appl. No.: 17/345,635

(22) Filed: Jun. 11, 2021

(65) Prior Publication Data
US 2021/0391903 A1  Dec. 16, 2021

Related U.S. Application Data

(60) Provisional application No. 63/038,043, filed on Jun. 11, 2020.

(51) Int. Cl.
*H04L 1/02* (2006.01)
*H04B 7/06* (2006.01)
(Continued)

(52) U.S. Cl.
CPC .......... *H04B 7/0617* (2013.01); *H01Q 3/02* (2013.01); *H01Q 13/10* (2013.01);
(Continued)

(58) Field of Classification Search
CPC ... H04L 1/0618; H04B 7/0417; H04B 7/0408; H04B 7/0617; H01Q 9/0457; H01Q 1/36;
(Continued)

(56) References Cited

U.S. PATENT DOCUMENTS 5,475,394 A * 12/1995 Kohls ............... H01Q 21/0037
343/846
9,537,559 B1    1/2017 Liu
(Continued)

FOREIGN PATENT DOCUMENTS

| | | |
|---|---|---|
| CN | 110784251 | 2/2020 |
| TW | 201032392 | 9/2010 |

(Continued)

OTHER PUBLICATIONS

International Search Report for International Application PCT/US2021/037058, dated Sep. 28, 2021.
(Continued)

*Primary Examiner* — Khai Tran
(74) *Attorney, Agent, or Firm* — Burris Law, PLLC

(57) ABSTRACT

An antenna system includes a module that is electrically coupled to a front-end electronic circuit layer configured to process one or more beams. The module includes a radiation layer including one or more radiating elements configured to at least one of transmit and receive the one or more beams and a feed layer including one or more feed elements, where the one or more feed elements are configured to excite the radiation layer, transmit the one or more beams, receive the one or more beams, or a combination thereof. The module further includes a distribution network layer including a wave distribution device, where the wave distribution device is configured to distribute the one or more beams from the front-end circuit layer to the feed layer.

26 Claims, 16 Drawing Sheets

(51) Int. Cl.
*H01Q 3/02* (2006.01)
*H01Q 13/10* (2006.01)
*H04B 7/0408* (2017.01)
*H04B 7/08* (2006.01)
*H04W 72/044* (2023.01)

(52) U.S. Cl.
CPC ......... *H04B 7/0408* (2013.01); *H04B 7/0634* (2013.01); *H04B 7/0695* (2013.01); *H04B 7/0842* (2013.01); *H04W 72/046* (2013.01)

(58) Field of Classification Search
CPC . H01Q 21/0006; H04W 16/28; H04W 88/085
USPC .................................................. 375/267, 299
See application file for complete search history.

(56) References Cited

U.S. PATENT DOCUMENTS

| | | | |
|---|---|---|---|
| 11,233,557 B2 | 1/2022 | Lee et al. | |
| 2010/0194640 A1* | 8/2010 | Navarro | H01Q 21/061 342/372 |
| 2014/0125511 A1* | 5/2014 | Longstaff | G05D 1/0858 342/33 |
| 2015/0263780 A1 | 9/2015 | Mehlman et al. | |
| 2015/0318618 A1 | 11/2015 | Chen et al. | |
| 2017/0194699 A1* | 7/2017 | Ouedraogo | G01J 5/0837 |
| 2018/0358709 A1* | 12/2018 | You | H01Q 21/064 |
| 2020/0091608 A1 | 3/2020 | Alpman et al. | |
| 2021/0257739 A1* | 8/2021 | Mathews | H01Q 1/2283 |
| 2021/0359420 A1* | 11/2021 | You | H01Q 13/18 |

FOREIGN PATENT DOCUMENTS

| | | |
|---|---|---|
| TW | 201728111 | 8/2017 |
| WO | 2020028579 | 2/2020 |

OTHER PUBLICATIONS

Search Report issued in corresponding TW Application 110121527, dated Jul. 21, 2022.
Search Report issued in corresponding TW Application 110121527, dated Jan. 12, 2022, 10 pages.

* cited by examiner

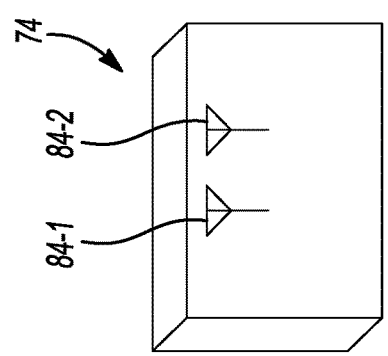
Fig-5B
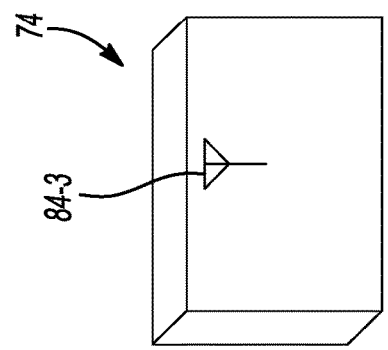
Fig-5C
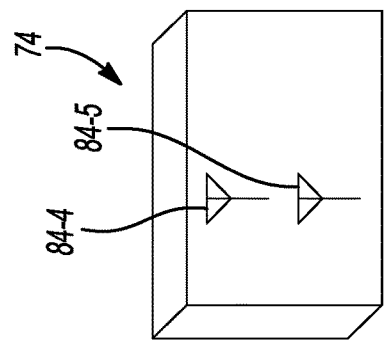
Fig-5D
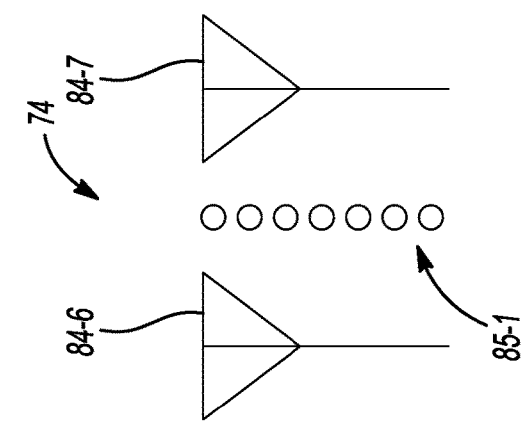
Fig-5E
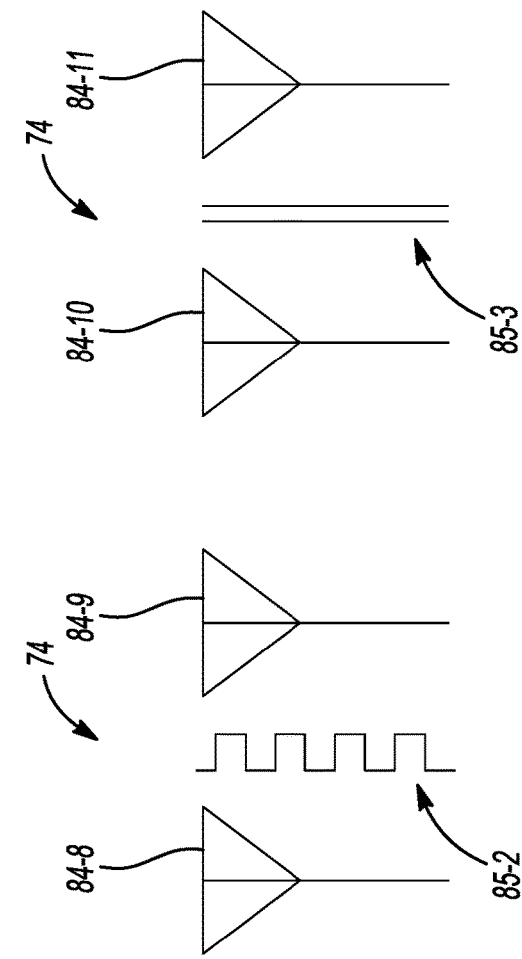
Fig-5F
Fig-5G

ANTENNA SYSTEM FOR A MULTI-BEAM BEAMFORMING FRONT-END WIRELESS TRANSCEIVER

CROSS-REFERENCE TO RELATED APPLICATIONS

This application priority to and the benefit of U.S. Provisional Application No. 63/038,043, filed on Jun. 11, 2020. The disclosure of the above application is incorporated herein by reference. This application is related to copending application filed concurrently herewith titled "SYSTEM AND METHOD FOR A MULTI-BEAM BEAMFORMING FRONT-END ARCHITECTURE FOR WIRELESS TRANSCEIVERS," which is commonly assigned with the present application and the contents of which is incorporated herein by reference.

FIELD

The present disclosure relates to wireless radio wave transceivers and, more specifically, to a multi-beam beamforming front-end antenna system.

BACKGROUND

The statements in this section merely provide background information related to the present disclosure and may not constitute prior art.

Radio wave wireless technology is ubiquitous and is used in various applications including, but not limited to: telecommunication and satellite communications industries, sensors and navigation systems in mobile platforms (e.g. self-driving cars in the automotive industry), among others.

Wireless communication technologies are transitioning to higher millimeter-wave frequency bands. These frequency bands have the advantage of availability of wider bandwidths to unlock increased connection speeds. Despite these advantages, however, current wireless technologies may implement sophisticated approaches and architectures compared to conventional wireless technologies.

For example, radio wave wireless devices may include antennas, radio frequency (RF) circuits, analog and digital circuits, along with the system architecture that controls the operation and connections of the various components. Together, the wireless front-end system defines the performance and functionality of the wireless device. For high data-rate wireless communications, especially at high millimeter-wave bands, high-gain front-end systems with often narrow beams, high power levels in transmission, and sensitivity levels in reception are needed to compensate for signal propagation losses over practical ranges. As such, high-gain front-end systems with advanced beamforming mechanism may be required to enable this wireless communication technology.

There are a number of approaches to implement beamforming in wireless front-ends, with phased-array systems and tunable metamaterial antennas often being considered as common approaches. Both approaches are based on distribution of radiating elements over an aperture with control over phase and/or amplitude of the individual elements to create a desired beamforming property. However, the phased-arrays and metamaterial technologies may have high spectral inefficiency, limited capacity, and high-power inefficiency (especially with large apertures and/or large number of elements), among others. More specifically, current analog phased arrays and metamaterials approaches are often limited to single beam operation for signal transfer and/or receive, which inhibits their capacity, aggregated throughput (for communication systems), and overall performance. Furthermore, for large apertures, high RF losses (especially with large number of elements in high gain front-ends) result in poor power efficiencies in these systems. Digital beamforming approaches, on the other hand, are capable of multi-beam operation. But with larger number of elements and wide operating bandwidths (especially at millimeter-wave frequency band), these approaches may not be implemented due to the excessive power consumption and power inefficiency in their digital and RF/analog circuitry (e.g. DACs and ADCs).

SUMMARY

This section provides a general summary of the disclosure and is not a comprehensive disclosure of its full scope or all of its features.

The present disclosure provides an antenna system configured to transmit or receive one or more beams in one or more spatial regions from among a plurality of spatial regions. The antenna system comprises a module that is electrically coupled to a front-end electronic circuit layer configured to process the one or more beams. The module includes a radiation layer comprising one or more radiating elements configured to at least one of transmit and receive the one or more beams and a feed layer comprising one or more feed elements, where the one or more feed elements are configured to excite the radiation layer, transmit the one or more beams, receive the one or more beams, or a combination thereof. The modules comprise a distribution network layer comprising a wave distribution device, wherein the wave distribution device is configured to distribute the one or more beams from the front-end electronic circuit layer to the feed layer.

In one form, the radiation layer includes a pixelated antenna aperture, a continuous antenna aperture, a planar antenna aperture, a conformal antenna aperture, a fixed antenna aperture, a tunable antenna aperture, a passive antenna aperture, a transmissive antenna aperture, a reflective antenna aperture, or a combination thereof.

In one form, the radiation layer comprises one or more metamaterial elements configured to at least one of transmit and receive the one or more beams, wherein the feed layer is configured to excite the one or more metamaterial elements to at least one of transmit and receive the one or more beams.

In one form, the radiation layer includes a tunable antenna aperture, and the plurality of radiating elements comprise a modification device configured to modify a phase of a signal, an amplitude of the signal, a polarization of the signal, a modulation of the signal, or a combination thereof. The modification device comprises a tunable device, an active device, a passive device, or a combination thereof.

In one form, the one or more radiating elements comprise at least two layers, and each layer from among the at least two layers comprises a dielectric substrate, an air-filled substrate, a patterned metal layer, a cavity-backed structure, a tunable device, an active device, or a combination thereof.

In one form, the one or more feed elements include a planar antenna, a 2.5D-shaped antenna, a 3D-shaped antenna, an active antenna, a passive antenna, a single port antenna, a multiport antenna, an air-filled antenna, a dielectric-filled antenna, or a combination thereof.

In one form, the wave distribution device is a network of one or more waveguides, a network of one or more transmission lines, a network of one or more dividers, a network of one or more combiners, a network of beamformers, a network of lens structures, a network of beamforming matrix structures, or a combination thereof.

In one form, the one or more waveguides include a leaky-wave waveguide, a slotted waveguide, a coplanar waveguide, a cavity-backed waveguide, a parallel plate waveguide, or a combination thereof.

In one form, the present disclosure provides a front-end antenna system comprising a controller and the antenna system, as provided herein, to output one or more beams in one or more spatial regions from among a plurality of spatial regions.

In one form, the front-end antenna system further comprises a plurality of beam networks and a plurality of transceivers, where each beam network from among the plurality of beam networks includes a plurality of beamforming circuits, a plurality of switching circuits, or a combination thereof. Each feed element from among the one or more feed elements includes one or more ports. Each port from among the one or more ports is electrically coupled to one or more beam networks from among the plurality of beam networks. Each beam network from among the plurality of beam networks corresponds to one of a transmission polarization and a receive polarization.

In one form, each module from among the one or more modules is provided on a first substrate layer, each module from among the one or more modules is electrically coupled to a second substrate layer via a plurality of connectors, where the second layer comprising one or more signal distribution networks, one or more circuits, or a combination thereof to electrically couple the one or more modules together.

In one form, the module is configured to simultaneously transmit and receive one or more signal streams over the one or more beams.

In one form, the feed layer further comprises an isolation element configured to isolate a set of feed elements from among the one or more feed elements, and the isolation element comprises a plurality of vias, an artificial boundary plane, a shield, a ground plane, a parasitic element, a cavity structure, a filter network, a cancellation network, or a combination thereof.

In one form, each feed element from among the set of feed elements is operable in a transmit mode, a receive mode, or a combination thereof, and the set of feed elements includes one feed element when each feed element from among the set of feed elements is operable in both the transmit mode and the receive mode.

In one form, the set of feed elements includes two or more feed elements when each feed element from among the set of feed elements is operable in one of the transmit mode and the receive mode, and the two or more feed elements have one of a planar arrangement and a non-planar arrangement.

In one form, the feed layer further comprises an isolation element configured to isolate a set of feed elements from among the one or more feed elements. The isolation element comprises a cancellation network configured to sample a transmitted signal for a set of ports of the set of feed elements, a set of signal streams of the set of feed elements, or a combination thereof. For a transmitted signal, the isolation element is configured to inject a secondary signal into a receive signal chain, wherein the secondary signal is configured to inhibit an interference of the transmitted signal on the receive signal chain.

In one form, the cancellation network comprises one or more signal splitters, one or more filter circuits, one or more delay elements, one or more attenuators, one or more combiners, or a combination thereof, and each component of the cancellation network is provided at a radio frequency (RF) stage, an intermediate frequency (IF) stage, a digital stage, a local oscillator (LO) stage, or a combination thereof.

In one form, the present disclosure provides a front-end antenna system comprises the antenna system, as provided herein, to output one or more beams in one or more spatial regions from among a plurality of spatial regions. the front-end antenna system further comprises a plurality of beam networks and a plurality of transceivers.

In some forms, the feed layer further comprises an isolation element configured to isolate a set of feed elements from among the one or more feed elements, and the isolation element comprises a plurality of vias, an artificial boundary plane, a shield, a ground plane, a parasitic element, a cavity structure, a filter network, a cancellation network, or a combination thereof. Each feed element from among the set of feed elements is operable in a transmit mode, a receive mode, or a combination thereof, and the set of feed elements includes one feed element when each feed element from among the set of feed elements is operable in both the transmit mode and the receive mode. The cancellation network is provided on an integrated circuit chip and includes at least one tunable component, and one or more portions of the cancellation network are provided at the plurality of beam networks, the plurality of transceivers, or a combination thereof.

The present disclosure provides an antenna system configured to transmit or receive one or more beams in one or more spatial regions from among a plurality of spatial regions. The antenna system comprises a module that is electrically coupled to a front-end electronic circuit layer configured to process the one or more beams. The module includes a radiation layer comprising one or more radiating elements configured to at least one of transmit and receive the one or more beams and a feed layer comprising one or more feed elements, where the one or more feed elements are configured to excite the radiation layer, transmit the one or more beams, receive the one or more beams, or a combination thereof. The module includes a distribution network layer comprising a wave distribution device, wherein the wave distribution device is configured to distribute the one or more beams from the front-end electronic circuit layer to the feed layer.

In one form, the feed layer further comprises an isolation element configured to isolate a set of feed elements from among the one or more feed elements, and the isolation element comprises a plurality of vias, an artificial boundary plane, a shield, a ground plane, a parasitic element, a filter network, a cavity structure, a cancellation network, or a combination thereof.

In one form, the one or more feed elements include a planar antenna, a 2.5D-shaped antenna, a 3D-shaped antenna, an active antenna, a passive antenna, a single port antenna, a multiport antenna, an air-filled antenna, a dielectric-filled antenna, or a combination thereof.

The present disclosure provides an antenna system configured to transmit or receive one or more beams in one or more spatial regions from among a plurality of spatial regions. The antenna system comprises a module that is electrically coupled to a front-end electronic circuit layer configured to process the one or more beams. The module includes a radiation layer comprising one or more radiating elements configured to at least one of transmit and receive the one or more beams, where the radiation layer includes a pixelated antenna aperture, a continuous antenna aperture, a planar antenna aperture, a conformal antenna aperture, a fixed antenna aperture, a tunable antenna aperture, a passive antenna aperture, a transmissive antenna aperture, a reflective antenna aperture, a plurality of metamaterial elements, or a combination thereof. The module includes a feed layer comprising one or more feed elements, where the one or more feed elements are configured to excite the radiation layer, transmit the one or more beams, receive the one or more beams, or a combination thereof, and where the one or more feed elements include a planar antenna, a 2.5D-shaped antenna, a 3D-shaped antenna, an active antenna, a passive antenna, a single port antenna, a multiport antenna, an air-filled antenna, a dielectric-filled antenna, or a combination thereof. The feed layer includes an isolation element configured to isolate a set of feed elements from among the one or more feed elements. The module includes a distribution network layer comprising a wave distribution device, where the wave distribution device is configured to distribute the one or more beams from the front-end electronic circuit layer to the feed layer, and wherein the wave distribution device is a network of one or more waveguides, a network of one or more transmission lines, a network of one or more dividers, a network of one or more combiners, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5B is a schematic of transmit and receive feed elements of a feed layer according to the teachings of the present disclosure;

FIG. 5C is a schematic of a transmit/receive feed element of a feed layer according to the teachings of the present disclosure;

FIG. 5D is a schematic of overlayed transmit and receive feed elements of a feed layer according to the teachings of the present disclosure;

FIG. 5E is a schematic of a plurality of vias that isolate transmit and receive feed elements of a feed layer according to the teachings of the present disclosure;

FIG. 5F is a schematic of an artificial boundary plane that isolates transmit and receive feed elements of a feed layer according to the teachings of the present disclosure;

FIG. 5G is a schematic of an isolation element that isolates transmit and receive feed elements of a feed layer according to the teachings of the present disclosure;

Figure 1:
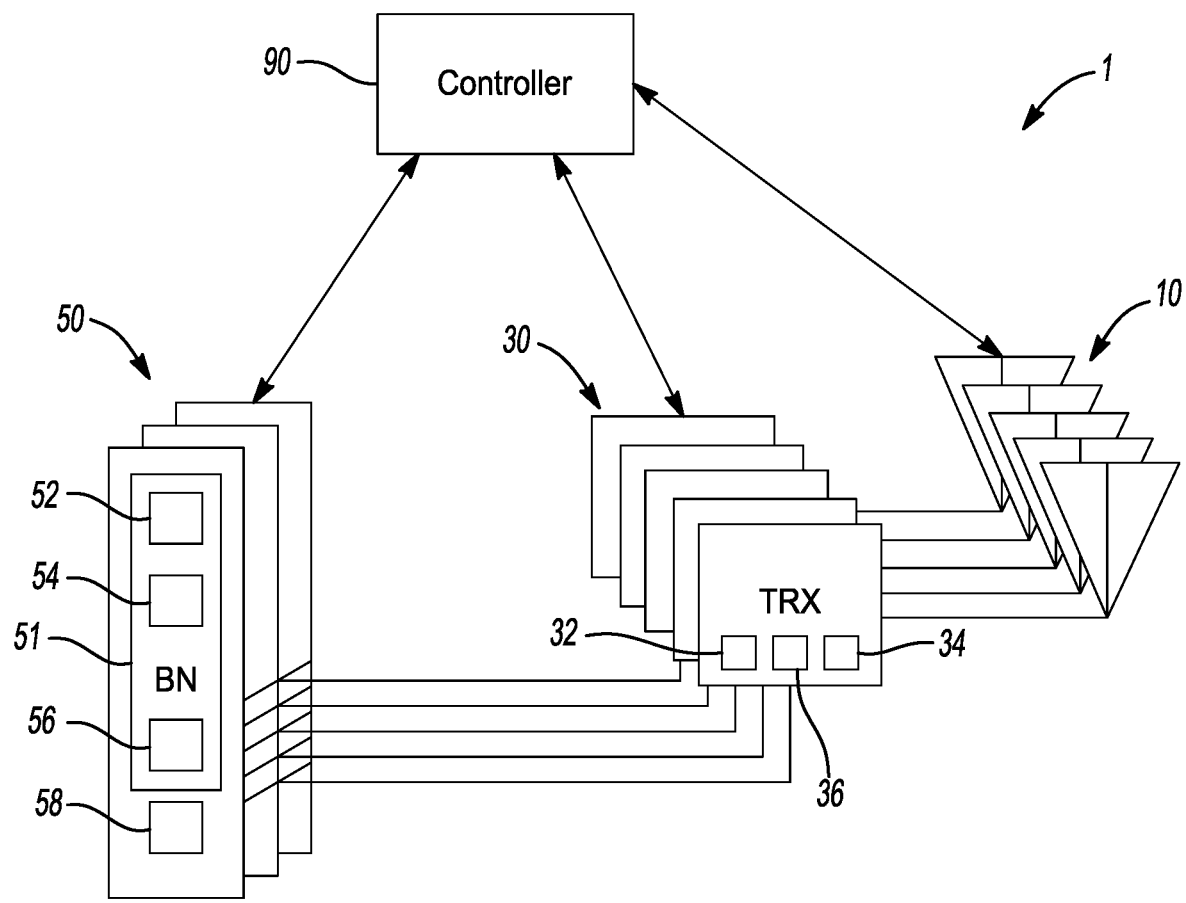
FIG. 1 is a schematic of a front-end antenna system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides an antenna system architecture for a wireless front-end transceiver that provides a unique combination of multi-beam beamforming, high power-efficiency, high spectral-efficiency, and scalability in operation frequency and size. The antenna system can be used as part of a front-end antenna system, and the front-end antenna system operates as a wireless front-end system and enables generation and/or reception of beams and electronic control of radio frequency (RF) pattern and beams with high precision and independent control of a various radiation parameters, such as a direction, a pattern, a power, a polarization, and/or a phase angle of the beam. In one form, the front-end antenna system transmits, receives, or concurrently transmits and receives one beam (e.g., single beam operation/mode) or multiple simultaneous beams (e.g., multi-beam operation/mode).

The antenna system of the front-end antenna system of the present disclosure may be implemented for various types of signal or power radio wave transmission and/or reception, such as front-end antenna systems, wireless sensing and imaging systems, and wireless power transfer systems, among others. Examples of front-end antenna systems include, but are not limited to: satellite signaling, wireless communication for network operators and internet service providers (ISPs), broadband, and/or general telecommunication. Example wireless sensing and imaging sensing systems include, but are not limited to: automotive radar sensor systems, security and safety imaging and screening sensor systems, medical imaging systems, among others. Example wireless power transfer systems include, but are not limited to: systems that use radio wave to transfer power/energy for wireless charging of electronic and electrical devices.

In one form, the antenna system of the front-end antenna system may be implemented for millimeter-wave frequency band communications (e.g. 5G/6G telecommunications), where excessive signal propagation losses are mitigated with large apertures and/or large number of radiating elements (and the associated transceiver and beamforming circuitry). As a result of a large number of radiating elements, conventional front-end antenna systems consume excessive power (e.g., power consumption resulting from digital beamforming methods), are limited in their functionality (e.g. number of beams, antenna gain, beamforming capability, among others), and/or require complex beamforming networks (e.g. large die size and count, complex routing and synchronization between elements, among others) that limits the aperture size.

The antenna system of the front-end antenna system of the present disclosure may further be implemented in telecommunication frequency bands including mid-band and/or low-band 5G signaling bands), satellite communication bands (e.g. X-, Ku-, Ka-, V-, W-bands), automotive radar band (e.g. W-band), or other licensed or unlicensed frequency bands (e.g. 60 GHz). The front-end antenna system may also be implemented in other frequency bands (e.g. RF, microwave, millimeter-wave, sub-millimeter-wave, terahertz, among other frequency bands).

In the multi-beam mode, the phased-array front-end antenna system having the antenna system of the present disclosure may function as a multi-input/multi-output (MIMO) signaling system that enables the simultaneous and continuous transmission (and/or reception) of multiple RF beams, with each beam capable of containing independent or correlated signals for enhanced communication and/or detection purposes. The multiple beams may also transfer power to multiple charging devices in a wireless power transfer system. The antenna system provides high precision shaping and control of each beams shape (e.g., pattern), pointing direction, power-level, polarization, etc., thereby enabling an operator to uniquely define the desired properties.

The front-end antenna system having the antenna system of the present disclosure may provide various benefits. The system and method are not limited to always providing such benefits, and are presented only as exemplary representations for how the system and method may be put to use. The list of benefits is not intended to be exhaustive and other benefits may additionally or alternatively exist.

As an example, the front-end antenna system having the antenna system of the present disclosure provides an increased information load capacity (e.g., aggregated throughput or data rate) in wireless communications. Multiple beams may provide for an increase in information transfer over a specific frequency band, thereby increasing the spectral efficiency and power efficiency.

As another example, the front-end antenna system having the antenna system of the present disclosure provides multiple beams that may provide continuous and simultaneous connections with multiple nodes, thereby improving speed and enabling complex, multi-node communication or more efficient wireless communication topologies.

As yet another example, the front-end antenna system having the antenna system of the present disclosure provides multi-beam MIMO operation for communications, thereby enabling spatial multiplexing methods for frequency reuse, increased capacity of the radio link, and improved spectral efficiency in the front-end antenna system.

Furthermore, conventional phased-array antennas only have a single beam, signal transfer with multiple locations that require beam hopping. As such, the multi-beam functionality provided by the phased-array antenna of the present disclosure provides continuous connections with multiple locations, thereby rendering beam hopping unnecessary.

The front-end antenna system of the present disclosure also provides for tracking moving signal sources, such as mobile phone users, planes, satellites, and cars, etc. Continuous connections provided by the front-end antenna system of the present disclosure enable continuous signal tracking and removing any delay required to track any signal, thereby minimizing the connectivity latency.

The antenna system of the present disclosure may additionally provide overlapping signal beams in a given direction or between given nodes in a communication network. As such, the front-end antenna system having the antenna system of the present disclosure provides added redundancy in the communication network.

As another example, the front-end antenna system having the antenna system of the present disclosure provides simultaneous transmission and reception to one or multiple nodes, which in turn reduces the latency of the communication system and increases the data-rate of the communication network.

For imaging systems, the front-end antenna system having the antenna system of the present disclosure increases detection resolution (e.g., angular and/or range resolutions). Furthermore, the multi-beam operation of the front-end antenna system enables faster imaging and detection as opposed to, for example, single-beam beam-steering systems.

For wireless power transfer systems, the front-end antenna system of the present disclosure provides for the generation of multiple beams for simultaneous charging of multiple wireless devices. As such, the front-end antenna system reduces charging time and improves efficiency of each device.

As another example, the front-end antenna system of the present disclosure reduces the complexity, size, and power for any given aperture size and for both single beam as well as multi-beam operations. Furthermore, the front-end antenna system of the present disclosure reduces the overall die circuitry size and count requirements for the given aperture dimensions. As a result, the front-end antenna system provides for reduced size, reduced weight, and reduced power consumption in the system.

In one form, the front-end antenna system includes at least one of a radio frequency (RF) stage, an intermediate frequency (IF) stage, and a digital stage. While specific stages are provided the front-end antenna system may include other stages such as a local oscillator stage.

In one form, referring to FIG. 1, a front-end antenna system 1 includes a plurality of antennas 10 (i.e., an array of antennas), a plurality of transceivers 30, and a plurality of beam networks 50. In one form, the transceivers 30 electrically connect the antennas 10 to the beam networks 50. In one form, the front-end antenna system 1 is operable as a multi-input/multi-output (MIMO) system providing multiple simultaneous beams and is operable to independently control the signal beam radiation parameters, such as a direction, a pattern, a power, a polarization, and a phase angle of the beam. In one form, the front-end antenna system 1 is operable to independently control a beam type of the beams, such as a transmit type beam, a receive type beam, and a simultaneous receive and transmit type beam. the beam type includes one of a transmit type beam, a receive type beam, and a simultaneous receive and transmit type beam. In one form, the front-end antenna system 1 may be implemented for both digital and analog signaling.

In one form, the front-end antenna system 1 is configured to transmit and receive beams of radio waves. In one form, the front-end antenna system 1 transmits and/or receives multiple beams of radio waves having different directions, patterns, power-levels, among other radiation parameters that are defined by a beam management control routine. In one form, the front-end antenna system 1 simultaneously transmits and receives one or more beams of radio waves.

In one form, the antennas 10 are configured to control the radiation parameters of the front-end antenna system 1, such as a wave/signal beam pattern(s), direction(s), among other radiation parameters. Example antennas 10 include, but are not limited to: planar antennas (such as patches, slots, rings, spirals, bow-ties, etc.), cavity-backed antennas, and membrane antennas.

In one form, the antennas 10 may include a single antenna element, a set of radiating elements, or a continuous radiating aperture. As an example, the set of antennas 10 includes aperture antennas, continuous aperture antennas, planar antennas, lens antennas (e.g., an elliptical lens, a Lunenberg lens, etc.), planar lens antennas (e.g., a Rotman lens), wire antennas, and/or reflector antennas. As another example, which may include metamaterial antennas, leaky-wave antennas, Fabry-Perot antennas, slot array antennas, waveguide antennas, among others. As a specific example, the grouped elements may include metamaterial antennas having metamaterial elements or meta-pixels that are arranged to generate the desired pattern and radiation property for each subset antenna.

In one form, the set of antennas 10 may include a single port antenna or multiport antenna, and any number/combination of single port and multiport antennas may be included. As an example, for a multiport implementation of the antenna 10, each port may excite and create a beam in a specific region, where the beams collectively span a select 3D Field-of-View (FoV) space. In one form, the beams of a multi-port antenna may have overlapping regions/patterns. The generation of the multi-beam pattern of the front-end antenna system 1 may be implemented by the multiport antenna sets, the array of antenna sets, or a combination thereof via the beam networks 50.

In one form, the antennas 10 may be passive antennas or active antennas. As an example, the antennas 10 may include an active antenna having tunable components (such as varactors, diodes, etc.) and/or tunable materials, (e.g. barium strontium titanate (BST), liquid crystal, etc.) integrated therein for dynamic control of a given antenna property (e.g. antenna pattern, beam pattern, etc.). In some forms, the active antenna is electronically controlled by a controller to create the desired radiation property, as described below in further detail.

In one form, the antennas 10 may be configured to perform additional beamforming operations. As an example, when the antennas 10 are multiport antennas, the front-end antenna system 1 may include at least one set of switching networks that connect the set of antennas and other system components, thereby enabling control functionality of the ports of the multiport antennas, as described below in further detail. As an example, the multiport antennas are operable to transmit the plurality of beams, receive the plurality of beams, or a combination thereof such that the plurality of beams have a same polarization, a same frequency band, or a combination thereof. Additional details regarding the modules are provided below in further detail.

In one form, the transceivers 30 are configured to selectively enable the antennas 10 to transmit/receive signals, directional beams, and/or multi-dimensional beams by connecting the antennas 10 to the beam networks 50. In one form, the transceivers 30 are implemented as sets of transceivers 30, where at least one transceiver 30 from a given set of transceivers connects one antenna 10 from the set of antennas to a set of beam networks 50. In one form, at least one transceiver 30 from a given set of transceivers connects one antenna 10 from the set of antennas to a set of beam networks 50. In one form, the number of transceivers 30 connecting to each antenna 10 is equal to the number of ports of the antenna 10. In one variation, the number of transceivers 30 connecting to each antenna 10 may be unequal to the number of ports of the antenna 10.

In one form, the transceivers 30 each include two or more amplifiers that amplify incoming and outgoing signals, such as a power amplifier 32 and a low noise amplifier 34. In one form variations, the transceivers 30 may include one or more switches 36 that enable switching between the power amplifier 32 and the low noise amplifier 34 and thus, enable switching between receiving and transmitting signals. Alternatively, the power amplifier 32 and the low noise amplifier 34 may be connected to the antenna ports of the antennas 10 without the switches 36 to enable simultaneous Tx/Rx and/or to omit the losses associated with the switches 36.

In one form, the low noise amplifier 34 is configured to amplify a signal received by the antenna 10 while adding minimal noise/distortion to the signal. The low noise amplifier 34 may have various gain, noise figures, linearity, and impedance matching properties. The low noise amplifier 34 may have various gain, noise figures, linearity, and impedance matching properties. In one form, the power amplifier 32 is configured to amplify the signal to a given power level for the antenna port. As such, the power amplifier 32 may have gain and power properties to amplify the signal to the given power level in accordance with the desired equivalent isotopically radiated power (EIRP) in the given direction/beam. In one form, the power amplifier 32 has high linearity and power-efficiency to support various modulated signals, such as orthogonal frequency-division multiplexing modulation. In some forms, the power output by the power amplifiers 32 may be enhanced using various techniques including, but not limited to, impedance transformation approaches, power combining techniques, and transistor stacking. These techniques may be implemented off-chip or on-chip, such as advanced silicon-based processes (e.g., bulk CMOS sub-um, silicon on insulator (SOI), and/or SiGe BiCMOS techniques).

As an example, the power amplifier 32 may be a Doherty power amplifier, an outphasing power amplifier, a Chireix outphasing power amplifier, or a combination thereof. As another example, the power amplifier 32 may be a linear-type power amplifier (e.g., class A amplifier, class B amplifier) or a switching-type power amplifier (e.g., Class E amplifier, Class $F^{-1}$ amplifier). As an additional example, the power amplifier 32 is a high-power amplifier that compensates for signal propagation attenuation losses and high RF losses of the front-end antenna system 1 when it is implemented in, for example, high-frequency millimeter-wave systems (i.e., high frequency includes 30 to 300 gigahertz).

In one form, the power amplifier 32 may include a predistortion circuit to improve the output signal linearity. The predistortion circuit may be implemented in a digital stage, an analog stage, or a combination thereof. In one example, the predistortion circuit is implemented in the digital stage and is a digital predistortion circuit (DPD circuit). In one form, DPD circuits may be based on memoryless models (e.g., memoryless polynomial algorithms and/or look-up table (LUT) based algorithms) or models with memory (e.g., a memory polynomial model). In another example, the DPD circuit is implemented based on information from one or more beams of the front-end antenna system 1 as opposed to the information from each power amplifier 32.

In In one form, the beam networks 50 include a beamformer network 51 and/or switching networks 58 that are configured to generate, provide, and/or alter signal streams (both incoming and outgoing) by constructive and destructive combination, selection, and/or manipulation of the signals to/from the antennas 10. The beam network 50 is configured to designate particular signal phases, amplitudes, and/or selection alternations in each signal path from each antenna 10 and/or set of antenna 10 for beamforming combining/processing for the desired signal streams/beams. While the beam network 50 is shown as including both of the beamformer network 51 and the switching network 58, it should be understood that the beam network 50 may include only one of the beamformer network 51 and the switching network 58 in some variations.

In one form, the beam networks 50 are provided in sets. Each set of the beam networks 50 is configured to generate multi-directional and/or multi-dimensional beams for multi-beam, multi-stream signal transmission and/or reception. The set of beam networks 50 is connected to each antenna 10 of a given set of antennas 10 via the transceivers 30. In one form, the beam networks 50 and/or the components thereof may be implemented at various stages, including an RF stage, an intermediate frequency (IF) stage, a baseband stage, a digital stage, or a combination thereof. In some forms, the beam networks 50 may be combined with the antennas 10 for hybrid beam networks when the antennas 10 include active antennas.

In one form, the beamformer network 51 includes a network of phase shifter (PS) circuits 52, a network of time delay circuits 54, an amplifier network 56, splitters, combiners, or a combination thereof. In one form, the network of phase shifter circuits 52 (hereinafter referred to as "phase shifters 52") are configured to receive an incoming signal and change the phase and amplitude of the beam related to the incoming signal. In one form, the phase shifters 52 may be implemented by analog circuits, digital circuits, or a combination thereof (e.g., a hybrid model). The phase shifters 52 may include active components (e.g., vector modulator-based phase shifters 52), passive components, or a combination thereof. As an example, the phase shifters 52 may include a reflection-type phase shifter (RTPS), a switched-transmission line phase shifter (STPS), a loaded line-based passive phase shifter, or a combination thereof.

In one form, the network of time delay circuits 54 (hereinafter referred to as "time delays 54") are also configured to receive an incoming signal and change the phase of the beam related to the incoming signal. As an example, the time delays 54 are configured to delay the signal by a controllable time delay that is defined and/or dynamically adjusted by a controller. In one form, the time delays 54 may be implemented by analog circuits, digital circuits, or a combination thereof (e.g., a hybrid model).

In one form, the phase shifters 52 and/or the time delays 54 are implemented as a true-time delay (TTD) to minimize beam squint or distortion of the beamformer networks 51. In one form, the phase shifters 52 and the time delays 54 may be collectively referred to herein as "delay elements."

In one form, the beamformer networks 51 include the amplifier network 56 when the beamformer networks 51 are implemented by analog circuitry. The amplifier network 56 is configured to modify the amplitude of a received or transmitted signal such that the signal is at a given strength before/after signal combining, splitting, and/or manipulation is performed. As an example, the amplifier network 56 may include one or more variable gain amplifiers that are implemented as an analog circuit, a digital circuit, or a combination thereof (e.g., a hybrid model).

In some forms, the beam networks 50 include the switching network 58 when, for example, the antennas 10 include multiport antennas. As an example, for each multiport antenna, the front-end antenna system 1 includes a switching network 58 that connects a subset of the multiport antenna ports to a set of transceivers 30. Additionally or alternatively, the front-end antenna system 1 may include a switching network 58 that connects the set of transceivers to the set of beamformer networks 51. In some forms, the switching network 58 connects all ports of the single-port/multi-port antennas to the transceivers 30 without any switching circuits. The switching network 58 is configured to provide different levels of component connectivity/activity, thereby consolidating or splitting beams and controlling beam direction. The switching network 58 may simplify the complexity of the beamformer and/or significantly increase the beamforming multi-beam, multi-stream functionality of the front-end antenna system 1. The switching network 58 may be implemented at various stages, such as the RF stage, the IF stage, the baseband stage, the digital stage, or a combination thereof. In one form, the switching network 58 includes one or more switches, one or more combiners, one or more splitters, one or more filters, one or more coupling lines, or a combination thereof.

In one form, the beamformer networks 51 may be an analog beamformer, digital beamformer, or a combination thereof (e.g., a hybrid beamformer). As an example, for large antenna apertures with large number of antenna elements/sets, the beamformer network 51 may be an analog beamformer or a hybrid beamformer due to the excessive power consumption of a digital beamformer. As another example, at higher frequency bands (e.g., millimeter-wave band), the beamformer network 51 may include an analog beamformer that is provided at the IF stage to inhibit losses of RF components and distribution/combination networks and/or the size of RF components at higher frequency bands. In some forms, where an IF implementation or a digital beamformer is employed, synchronization of Local Oscillator (LO) signals may be performed at all antenna elements and/or antenna sets, along with implementation of mixers at antenna set and/or sub-set level. In some forms, the LO signal synchronization may be implemented by a reference signal, a Phase-Locked Loop (PLL) circuit, an amplifier circuit, a mixer, or a combination thereof implemented at antenna elements, antenna sets, and/or antenna sub-set levels.

In some forms, the front-end antenna system 1 may include a controller 90. The controller 90 is configured to operate the components of the front-end antenna system 1 to achieve a desired output. In one form, the controller 90 is connected to all active components and is configured to perform beam management control routines, beam-tracking routines, user management routines, among others. As an example, the controller 90 may independently set a power-level, bandwidth, beam direction, beam width, polarization, number of streams/users, communication range and modulation, among other signal parameters for one or more of the beams. In one form, the controller 90 may be automated such that the system responds in a specific manner to input and output signals to and from the front-end antenna system 1. In one form, the controller 90 enables user management of any and/or all desired front-end antenna system parameters (e.g. level of signal amplification, setting beam form and directions). In one form, the controller 90 enables management of the signal flow in a communication network.

Figure 2A:
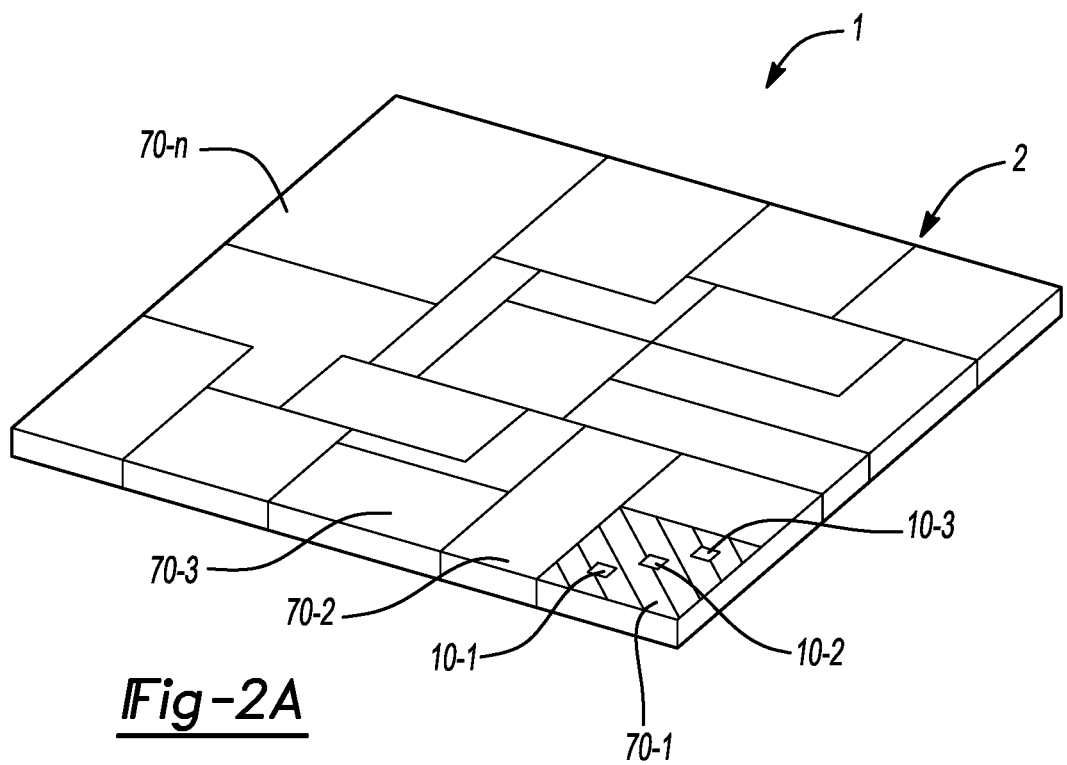
FIG. 2A is a schematic of one or more modules of a front-end antenna system provided in one form according to the teachings of the present disclosure.
Figure 2B:
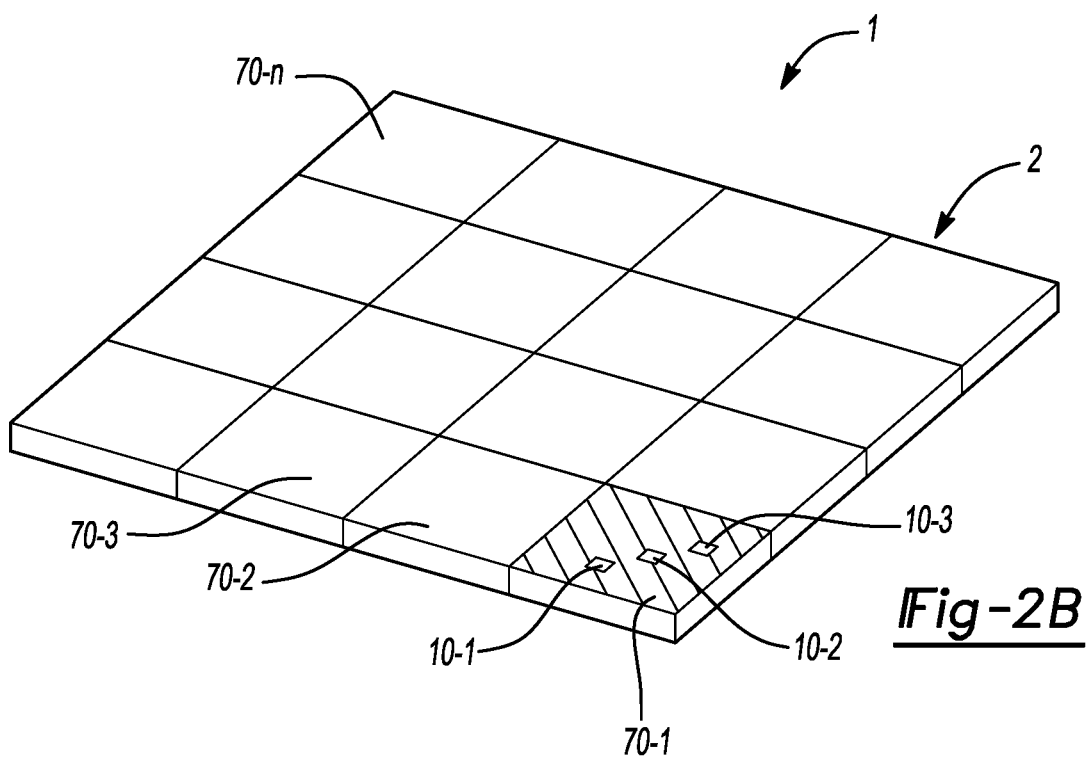
FIG. 2B is a schematic of one or more modules of a front-end antenna system in another form according to the teachings of the present disclosure.

In one form, the front-end antenna system 1 may be implemented as an array (e.g., a dynamic array, a fixed array, an active array, a passive array, a digital array, an analog array, or a hybrid array, among other array types). As an example and as shown in FIGS. 2A-2B, the front-end antenna system 1 may include one or more modules 70-1, 70-2, 70-3, . . . 70-*n* (collectively referred to herein as modules 70) that collectively form an array 2. Each of the modules 70 includes a set of the antennas 10 from among the plurality of antennas 10. As an example, the module 70-1 may include a set of antennas that includes antennas 10-1, 10-2, 10-3 from among the plurality of antennas 10.

In one form, the one or more modules 70 may be identical or dissimilar to each other. As an example, each module 70 may have the same geometric parameters (e.g., shape, size, orientation, length, width, depth, etc.), as shown in FIG. 2B. As another example, two or more of the modules 70 may have a set of geometric parameters that are dissimilar to each other, as shown in FIG. 2A. In one form, the modules 70 are randomly arranged or are arranged in a grid or line. In one form, the one or more modules 70 may have various planar, non-planar, or conformal shapes (e.g., rectangular, circular, hexagonal, etc.). Additionally, the one or more modules 70 may be integrated with each other in a planar fashion, non-planar fashion, or a conformal fashion. In one form, the one or more modules 70 may interleave or overlap each other. In one form, the one or more modules 70 form a sparse configuration to expand the front-end aperture, and the one or more modules 70 may be rotated and shifted with respect to each other to suppress sidelobes.

In one form, the size and geometry of the front-end antenna system 1 may be based on the number of array antennas, the number of elements of each antenna, and/or dimensions of a continuous aperture antenna. In one form, the size and geometry of the front-end antenna system 1 are based on a desired signal strength, frequency bandwidth, signal load capacity, number of incoming/outgoing signals, among other signal transmission and/or reception parameters. As an example, in a 5G implementation, the front-end antenna system 1 includes the array 2 having 236 elements (e.g., 16×16 array) or 1024 elements (32×32 array). As another example, in a long-distance communication implementation, the array 2 includes 2000 elements (or an equivalent of 2000 element size when the antennas 10 are implemented by a continuous aperture antenna sub-array).

Figure 3:
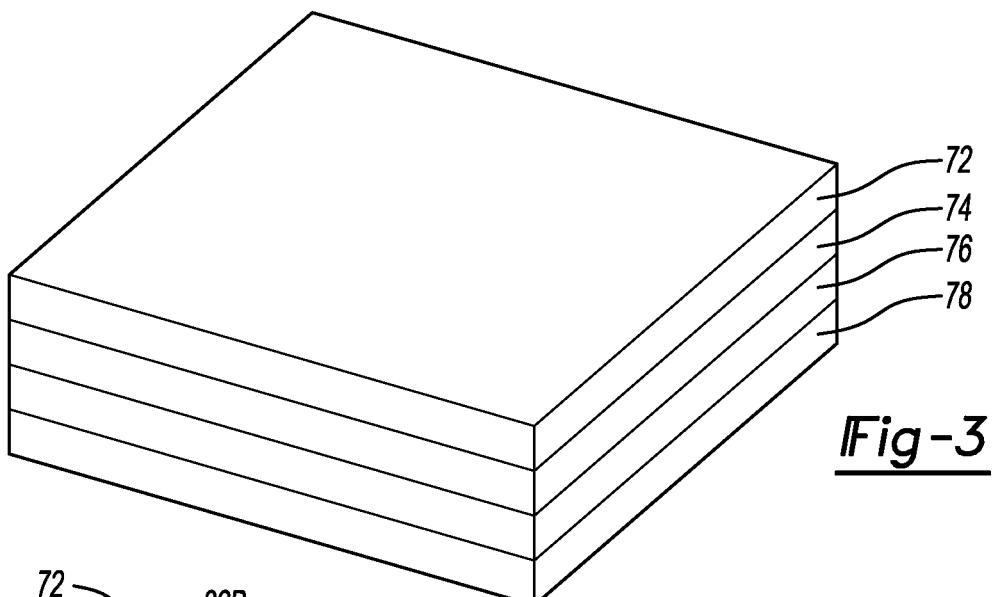
FIG. 3 is a schematic of various layers of a module of a front-end antenna system according to the teachings of the present disclosure.

Referring to FIG. 3, various layers of a given module 70 are shown. In one form, the module 70 includes a radiation layer 72, a feed layer 74, and a distribution network layer 78. In one form, the radiation layer 72 is configured to transmit and/or receive one or more beams. In one form, the feed layer 74 is configured to excite the radiation layer 72 to transmit and/or receive the one or more beams. It should be understood that the feed layer 74 is configured to transmit and/or receive the one or more when the radiation layer 72 is merged with the feed layer 74. As such, when the radiation layer 72 and the feed layer 74 are merged into a single, physical layer, the functionality of the radiation layer 72 and the feed layer 74 may be performed using similar elements. While the radiation layer 72 is shown as disposed above the feed layer 74, it should be understood that the feed layer 74 may be disposed above the radiation layer 72 when the radiation layer 72 includes a reflective material.

In one form, the module 70 is electrically coupled to a front-end electronic circuit layer 76. In one form, the front-end electronic circuit layer 76 is configured to form the one or more beams. In one form, the distribution network layer 78 is configured to distribute the one or more from the front-end electronic circuit layer 76 to the feed layer 74. In one form, the distribution network layer 78 is configured to form the plurality of beams. It should be understood that the order, combination, and positioning of the layers may vary in other forms.

In one form, the front-end electronic circuit layer 76 comprises a transmitter or a receiver. In one form, the front-end electronic circuit layer 76 generates and amplifies one or more transmit signals. In another form, the front-end electronic circuit layer 76 receives, amplifies, and recreates one or more received signals. In another example, the front-end electronic circuit layer 76 processes and alters one or more streams of signals that are coupled to one or more antenna ports of the antennas 10.

To perform the functionality described herein, the front-end electronic circuit layer 76 may include a frequency convertor, a digital-to-analog convertor (DAC), an analog-to-digital convertor (ADC), a power amplifier (PA) (e.g., the power amplifier 32), a low noise amplifier (LNA) (e.g., the low noise amplifier 34), a mixer, a switch, a phase shifter (e.g., the phase shifter 52), a delay line, a variable-gain amplifier (VGA), a phased lock loop (PLL), a reference signal, a diplexer, or a combination thereof. In some forms, the front-end electronic circuit layer 76 comprises a beamformer network, a switching network, a transceiver, or combination thereof.

In some forms, the front-end electronic circuit layer 76 comprises a beam network (e.g., the beam network 50), a transceiver (e.g., the transceiver 30), or a combination thereof. In some forms, the front-end electronic circuit layer 76 comprises one or more input ports, one or more output ports, or combination thereof. In some forms, the front-end electronic circuit layer 76 comprises one or more circuit chips, one or more integrated circuit (IC) chips, one or more RF integrated circuits (RFIC) chips, one or more Application-Specific integrated circuit (ASIC), one or more System-on-a-Chip (SoC), etc. In one form, the front-end electronic circuit layer 76 layer comprises one or more chips that are mounted on a substrate. In some forms, the front-end electronic circuit layer 76 is configured to provide an RF stage, an IF stage, a digital stage, a LO stage, or a combination thereof.

Figure 4:
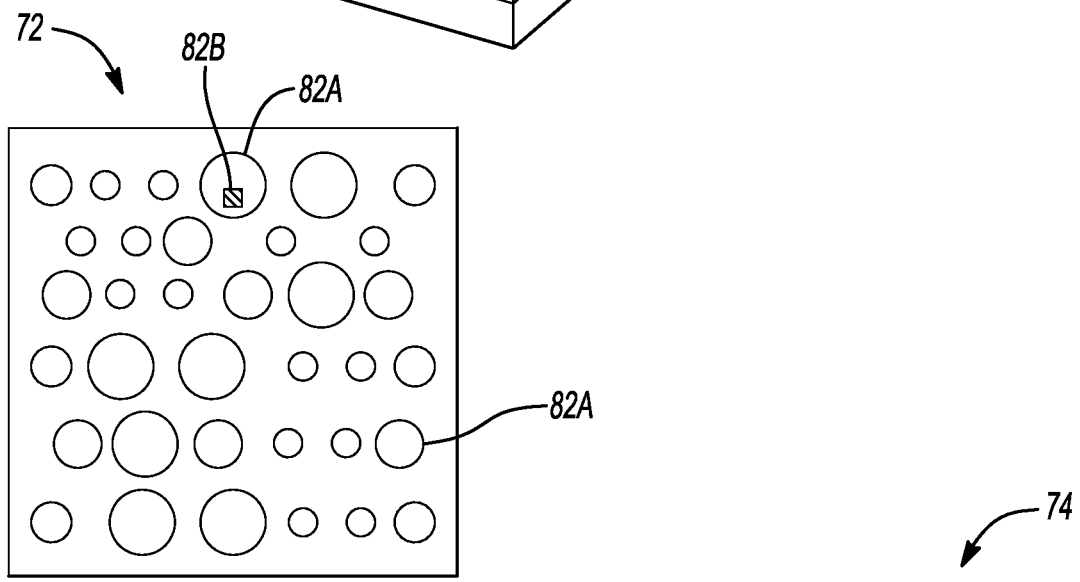
FIG. 4 is a schematic of a radiation layer of a module of a front-end antenna system according to the teachings of the present disclosure.

Referring to FIG. 4, a schematic of the radiation layer 72 is shown. In one form, the radiation layer 72 includes one or more radiating elements 82A that are configured to transmit and/or receive one or more beams. As such, the feed layer 74 is configured to excite the radiating elements 82A to transmit and/or receive the one or more beams. As an example, the radiating elements 82A may include, but are not limited to: a pixelated antenna aperture, a continuous antenna aperture, a planar antenna aperture, a conformal antenna aperture, a fixed antenna aperture, a tunable antenna aperture, a passive antenna aperture, a transmissive antenna aperture, a reflective antenna aperture, or a combination thereof. As another example, the radiating elements 82A may include a plurality of metamaterial elements and/or meta-pixels configured to generate the desired pattern and radiation property for each module 70.

In one form, the radiating elements 82A may have a plurality of layers (i.e., two or more layers). In one form, each layer may include, but is not limited to: a dielectric substrate, an air-filled substrate, a patterned metal layer, a cavity-backed structure, a tunable device, an active device, or a combination thereof.

In one form, the radiating elements 82A further comprise a modification device 82B configured to modify a phase, amplitude, polarization, modulation, or a combination thereof of the plurality of beams. Example modification devices 82B include, but are not limited to: a tunable device/material, an active device, or a combination thereof.

In one form, the radiating elements 82A are multilayered structures (e.g., two or more layers), where each layer comprises a dielectric layer, an air-filled layer, a patterned metal layer, a patterned dielectric layer, an active device, a passive device, a tunable device, or a combination thereof. In one form, the number of layers, the structure of each layer, the overall shape and size of the layers, and/or the tunable device enhance the bandwidth (e.g., broad bandwidth, narrow bandwidth, multi-band, bandwidth selection or rejection, etc.), the tuning range, (e.g. tuning the phase variation, amplitude variation, polarization variation, frequency variation, modulation variation, etc.), or other parameters of the radiated signals.

Figure 5A:
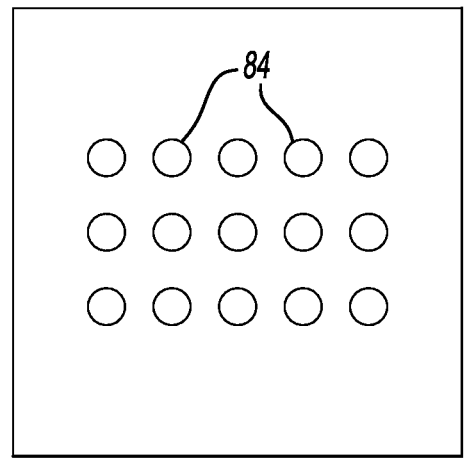
FIG. 5A is a schematic of a feed layer of a module of a front-end antenna system according to the teachings of the present disclosure.

Referring to FIG. 5A, a schematic of the feed layer 74 is shown. In one form, the feed layer 74 includes a plurality of feed elements 84 configured to excite the radiating elements 82A of the radiation layer 72 and/or transmit/receive the beams. As an example, the feed elements 84 may include, but are not limited to: a planar antenna, a 2.5D-shaped antenna, a 3D-shaped antenna, an active antenna, a passive antenna, a single port antenna, a multiport antenna, an air-filled antenna, a dielectric-filled antenna, or a combination thereof.

Furthermore, the feed elements 84 have various spatial arrangements and may be operable in a transmit mode, a receive mode, or both. As an example and as shown in FIG. 5B, feed elements 84-1, 84-2 are arranged on a given plane, the feed element 84-1 is operable in the transmit mode, and the feed element 84-2 is operable in the receive mode. As another example and as shown in FIG. 5C, the feed element 84-3 is operable in both the receive mode and the transmit mode. As yet another example and as shown in FIG. 5D, feed elements 84-4, 84-5 physically overlay each other and have a nonplanar arrangement such that one of the feed elements 84-4, 84-5 is positioned in a radiation direction of the other feed element 84-4, 84-5. Furthermore, the feed element 84-4 may be operable in the transmit mode, and the feed element 84-5 may be operable in the receive mode (or vice versa).

In one form, a pair of feed elements 84 that are operable in one of a transmit mode and a receive mode may be isolated via an isolation element. As an example and as shown in FIG. 5E, feed elements 84-6, 84-7 are isolated by a plurality of vias 85-1 extending through the feed layer 74 and collectively forming a via fence to inhibit electromagnetic coupling between the feed elements 84-6, 84-7. As another example and as shown in FIG. 5F, feed elements 84-8, 84-9 are isolated by an artificial boundary plane 85-2 (e.g., perfect magnetic conductor (PMC) wall, a perfect electric conductor (PEC) wall, among others) to inhibit electromagnetic coupling between the feed elements 84-8, 84-9. As an additional example and as shown in FIG. 5G, feed elements 84-10, 84-11 are isolated by ground shields (or ground planes) 85-3 to inhibit electromagnetic coupling between the feed elements 84-10, 84-11.

Figure 5H:
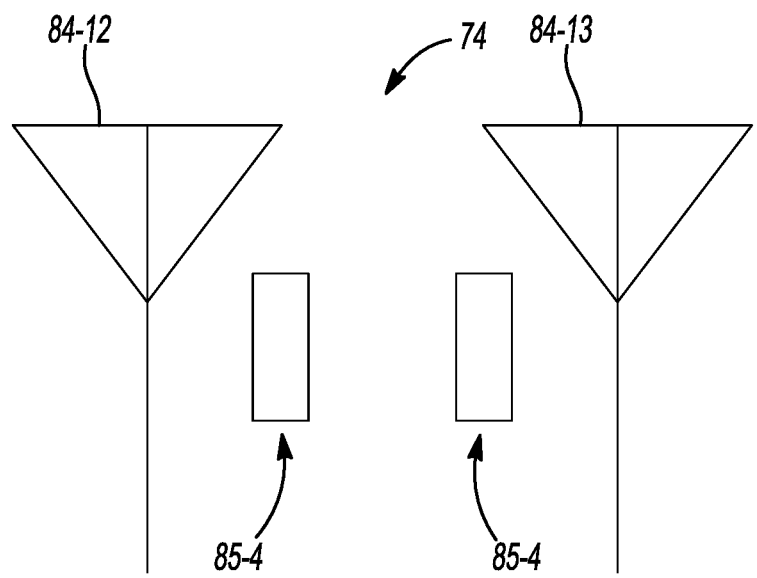
FIG. 5H is a schematic of a plurality of parasitic elements that isolates transmit and receive feed elements of a feed layer according to the teachings of the present disclosure.

As another example and as shown in FIG. 5H, feed elements 84-12, 84-13 are isolated by parasitic elements 85-4 configured to control the leakage of the signals transmitted and received by the feed elements 84-12, 84-13. Specifically, the parasitic elements 85-4, which may be operable as passive or active resonators, may control the signal transmitted or received by the feed elements 84-12, 84-13 such that the interference is altered, inhibited, or canceled. In one form, the parasitic elements 85-4 alter the phase and/or amplitude of the coupled signal from the feed elements 84-12, 84-13. In one form, the parasitic elements 85-4 alter the phase and/or amplitude of the coupled signal through a specific coupling path from the feed elements 84-12, 84-13.

Figure 5I:
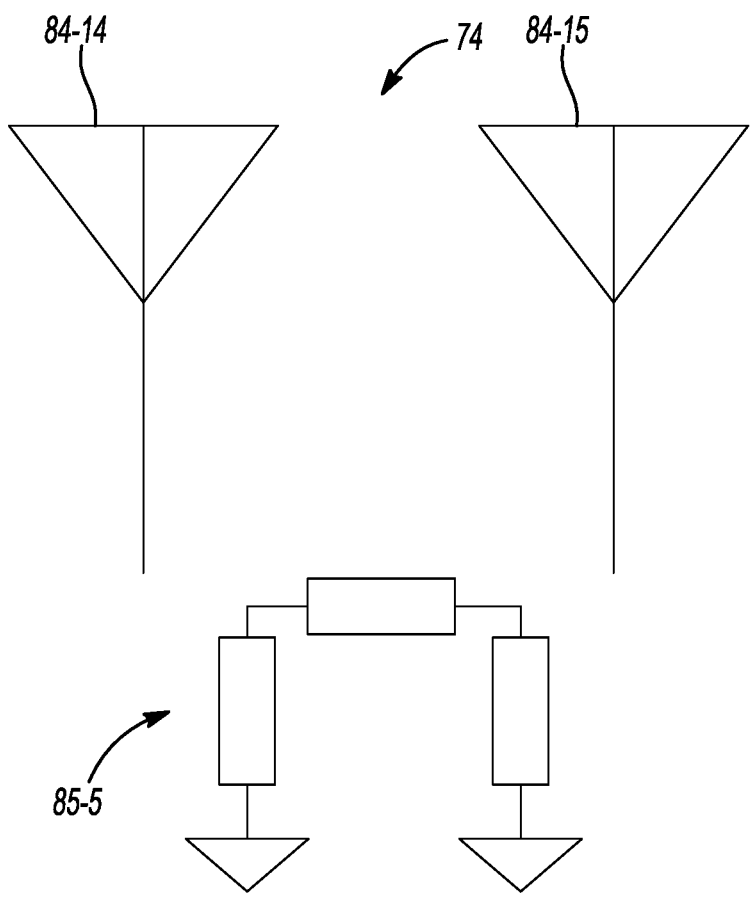
FIG. 5I is a schematic of a filter network that isolates transmit and receive feed elements of a feed layer according to the teachings of the present disclosure.

As a further example and as shown in FIG. 5I, feed elements 84-14, 84-15 are isolated by a filter network 85-5. In one form, the filter network 85-5 includes capacitors and/or inductors that collectively form a Pi-network, a T-network, an L-network, or a combination thereof to suppress harmonics and inhibit electromagnetic coupling between the feed elements 84-14, 84-15. In one form, the filter network 85-5 includes parasitic elements with an equivalent circuit model of capacitors and/or inductors that collectively form a Pi-network, a T-network, an L-network, or a combination thereof to suppress harmonics and inhibit electromagnetic coupling between the feed elements 84-14, 84-15. In one form, the parasitic elements and/or filters are provided and/or integrated in the antenna 10, the antenna ports, or a combination thereof.

Figure 5J:
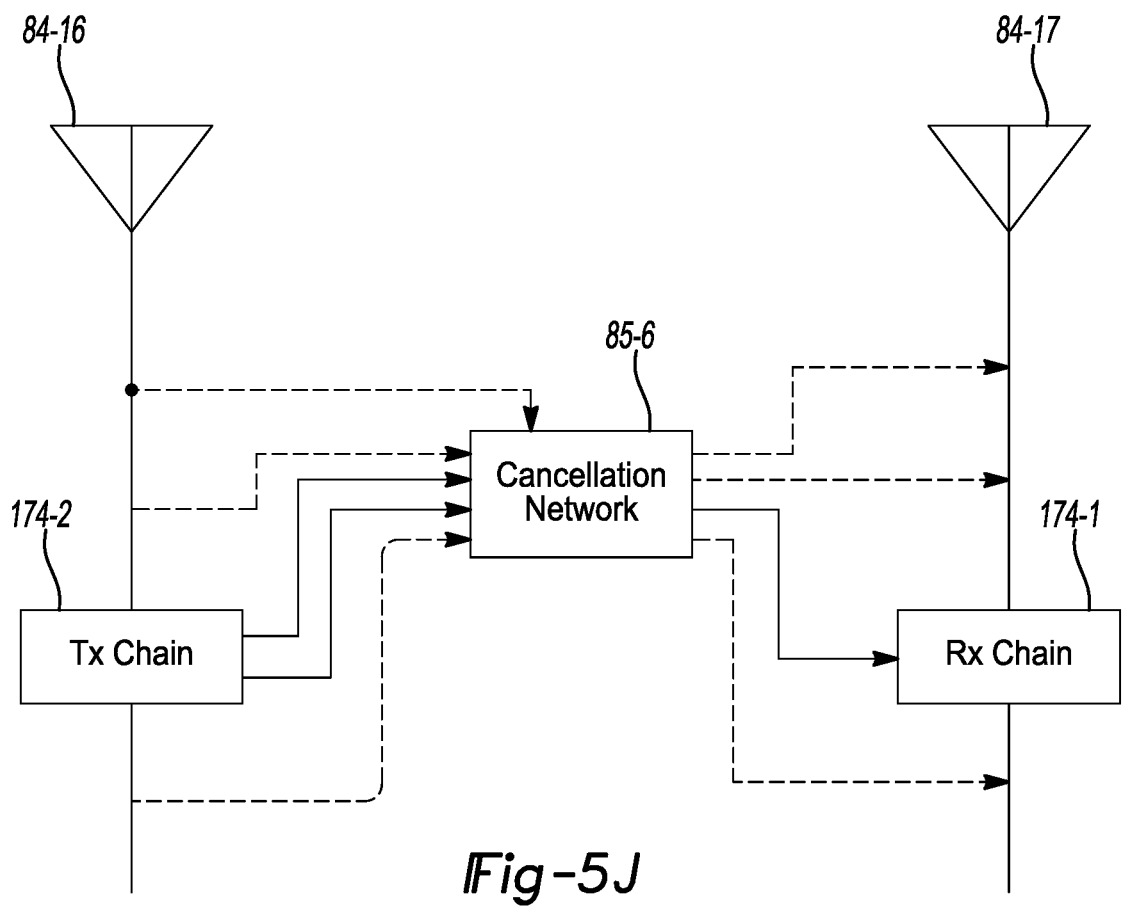
FIG. 5J is a schematic of a cancellation network that isolates transmit and receive feed elements of a feed layer according to the teachings of the present disclosure.
Figure 5K:
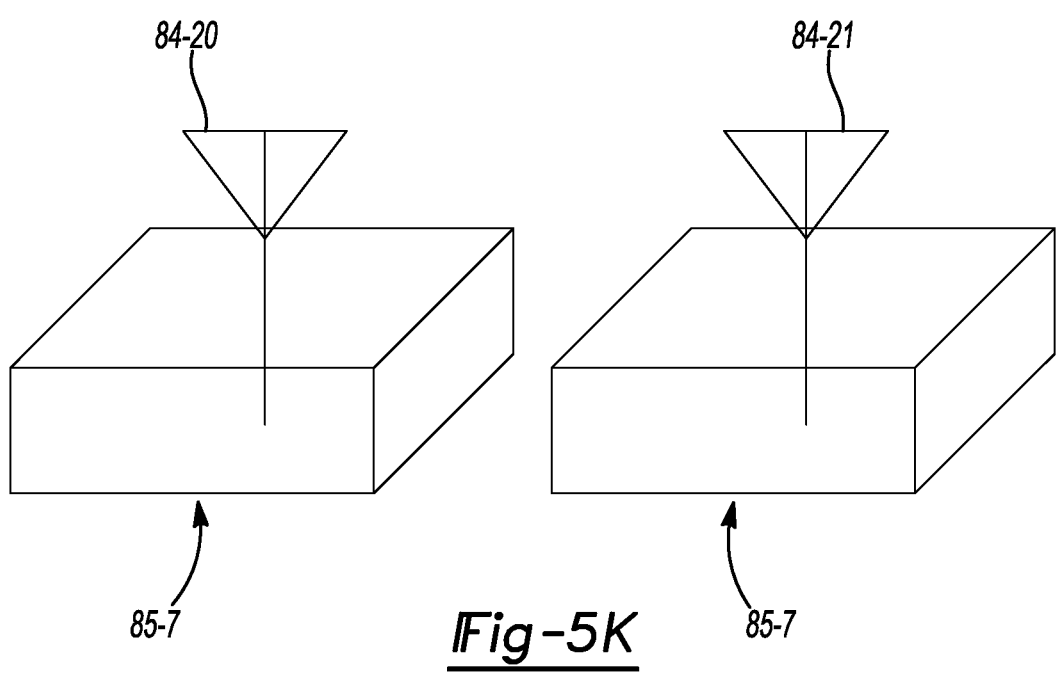
FIG. 5K is a schematic of cavities that isolate transmit and receive feed elements of a feed layer according to the teachings of the present disclosure.
Figure 5L:
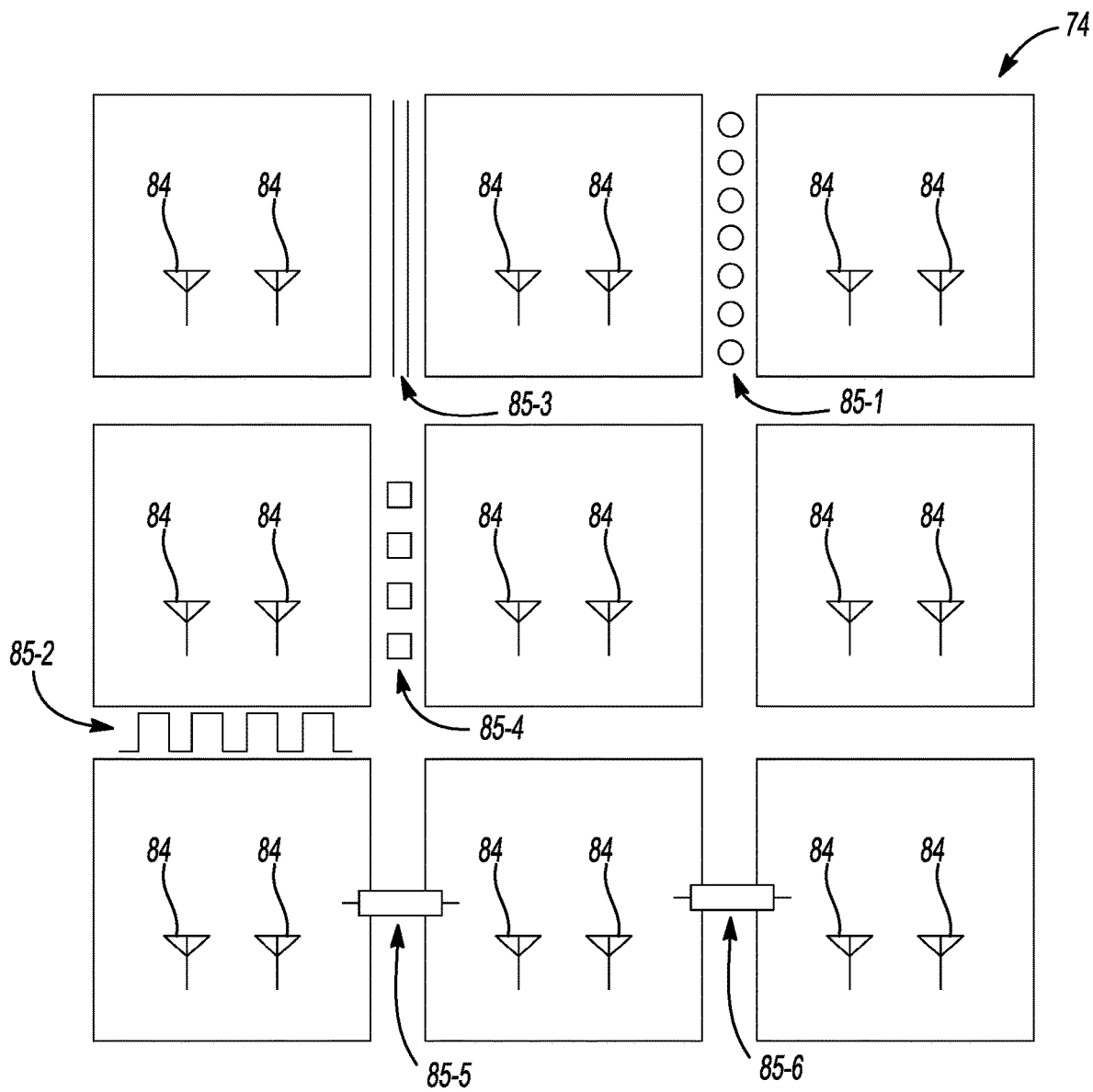
FIG. 5L is a schematic of a plurality of isolation elements and a plurality of feed elements of the feed layer according to the teachings of the present disclosure.

As yet another example and as shown in FIG. 5K, feed elements 84-20, 84-21 are isolated by cavities 85-7 to inhibit electromagnetic coupling between the feed elements 84-20, 84-21. While the feed elements 84 shown in FIGS. 5E-5K are illustrated in a planar arrangement, it should be understood that any of the respective feed elements 84 may have a nonplanar arrangement in other forms.

In one form and as shown in FIG. 5J, feed elements 84-16, 84-17 are isolated by a cancellation network 85-6. While the cancellation network 85-6 is shown as isolating the feed elements 84-16, 84-17, it should be understood that the cancellation network 85-6 may isolate multiple pairs of feed elements 84 that are operable in one of the transmit/receive mode (e.g., the cancellation network 85-6 isolates each transmit mode feed element from each respective receive mode feed elements and vice versa).

In one form, the cancellation network 85-6 is configured selectively inject a secondary signal onto the a receive (Rx) signal chain 174-1 to inhibit interference of the Rx signal chain 174-1 caused by a signal on a transmit (Tx) signal chain 174-2. In one form, the Rx signal chain 174-1 includes various components of the front-end antenna system 1 that are utilized to receive one or more signal streams over a one or more of beams, and the Tx signal chain 174-2 includes various components of the front-end antenna system 1 that are utilized to transmit multiple signal streams over a plurality of beams. In one form, the cancellation network 85-6 is configured to sample a transmitted signal of each port and signal stream of the feed element 84-16. For one or more of the transmitted signals, the cancellation network 85-6 is configured to inject a secondary signal onto the Rx signal chain 174-1 to cancel the interference caused by the transmitted signals on the Rx signal chains. In one form, cancellation network 85-6 is a tunable network wherein it controls and adjusts the parameters of the sampled and/or injected signals.

To perform the functionality described herein, the cancellation network 85-6 may include one or more signal splitters, one or more filter circuits, one or more phase shifters and/or time delays, one or more attenuators, one or more combiners, one or more tunable components, or a combination thereof. In one form, the cancellation network 85-6 is implemented in an integrated circuit chips, where the cancellation network 85-6 is provided at a radio frequency (RF) stage, an intermediate frequency (IF) stage, a digital stage, a local oscillator (LO) stage, or a combination thereof. In one form, the cancellation network 85-6 shares a portion of the components, circuits, or combination thereof in the beam network 50 and/or the transceivers 30. In one form, the sampled signals and/or injected signals from the signal chains are coupled to one or more ports of the beam network 50 to implement the cancellation network 85-6 through the beam network 50.

It should be understood that any combination of the isolation elements (i.e., the plurality of vias 85-1, the artificial boundary plane 85-2, the ground shields 85-3, the parasitic elements 85-4, the filter network 85-5, the cancellation network 85-6, and the cavities 86-7) may be provided between a pair of feed elements 84 and/or multiple feed elements 84. As an example and as shown in FIG. 5K, the feed layer 74 includes each of the plurality of vias 85-1, the artificial boundary plane 85-2, the ground shields 85-3, the parasitic elements 85-4, filter network 85-5, the cancellation network 85-6, and the cavities 86-7 to isolate various pairs of the feed elements 84 from each other.

Figure 6A:
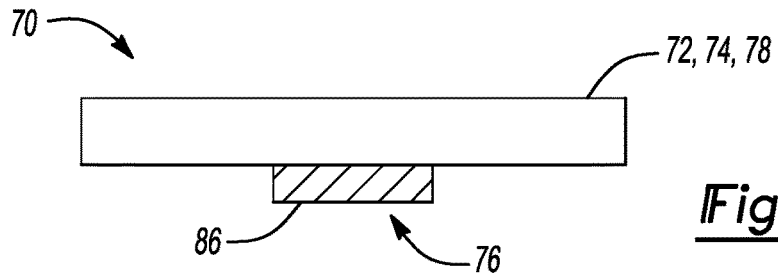
FIG. 6A is a schematic of a circuit layer of a module of the front-end antenna system according to the teachings of the present disclosure.
Figure 6B:
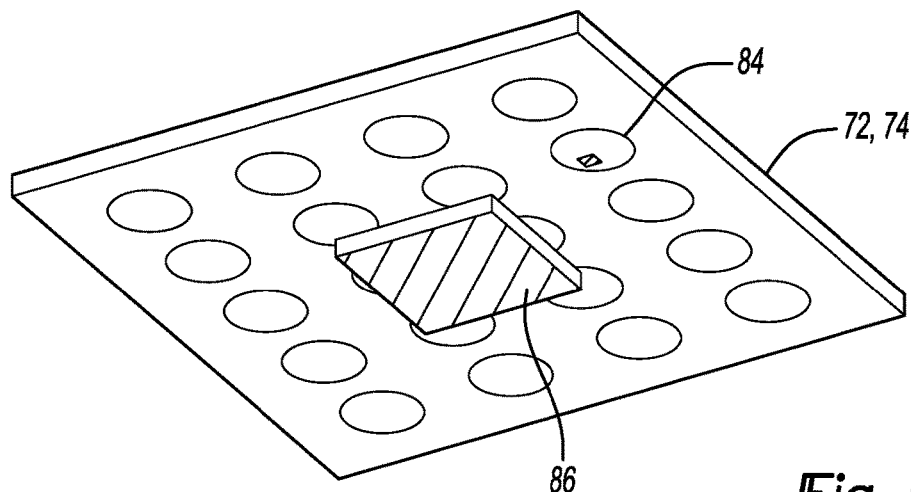
FIG. 6B is a schematic of a circuit layer of a module of the front-end antenna system in another form according to the teachings of the present disclosure.

Referring to FIGS. 6A-6B, a schematic of the module 70 is shown. In one form, the radiating layer 72 includes the one or more radiating elements 82A, which are coupled to one or more feed elements 84 of the feed layer 74. As described above, the radiation layer 72 and the feed layer 74 may be merged in some forms. In one form, the front-end electronic circuit layer 76 includes one or more circuits 86 (e.g., an integrated circuit (IC), a radio frequency IC (RFIC), etc.) that are configured to generate the plurality of beams. As such, the one or more circuits 86 may include various components of the front-end antenna system 1, such as the transceivers 30, the beamformer networks 50, and/or the controller 90. In one form, the one or more circuits 86 may include baseband, digital, modem, and/or control circuitry in a System-on-a-Chip (SoC) configuration for performing the functionality described herein. In one form, each of the one or more circuits 86 is associated with the given module 70 (i.e., the one or more circuits 86 are electrically coupled to the feed layer 74 of the given module 70). It should be understood that the one or more circuits 86 may be associated with a plurality of modules 70 (e.g., a single IC 86 is provided for a plurality of modules 70). In one form, the module 70 includes one or more printed circuit board (PCB) layers.

Figure 7A:
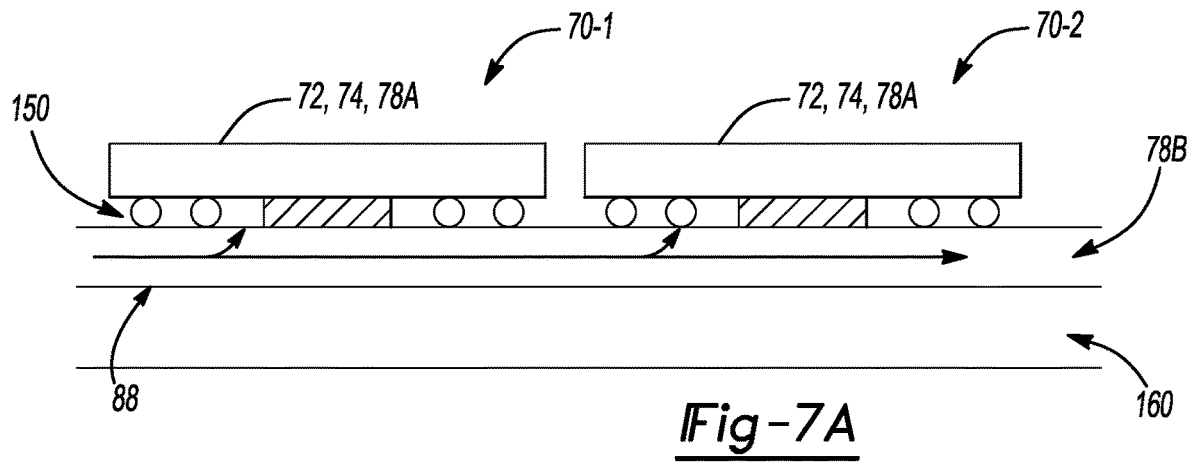
FIG. 7A is a schematic of a distribution network layer of a module of the front-end antenna system according to the teachings of the present disclosure.
Figure 7B:
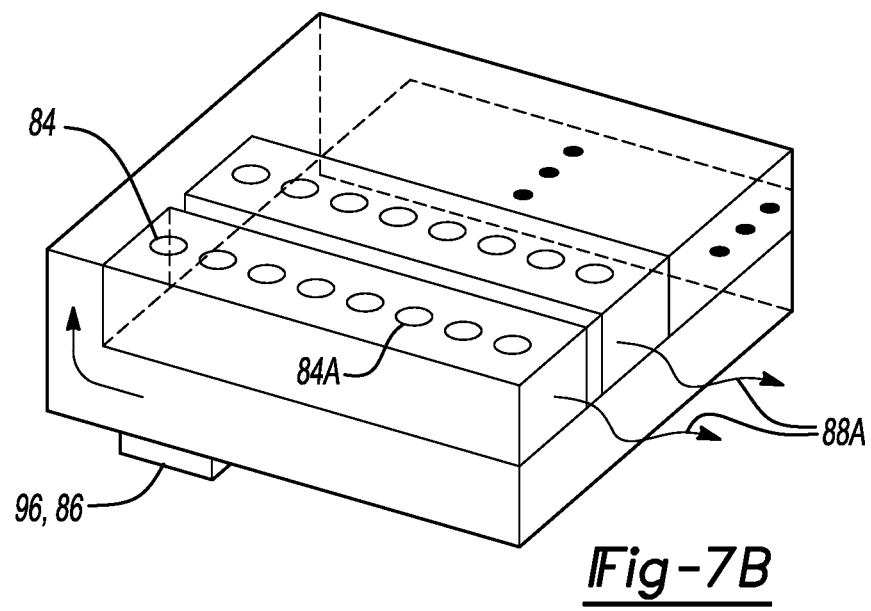
FIG. 7B is a schematic of a distribution network layer of a module of the front-end antenna system according to the teachings of the present disclosure.

Referring to FIG. 7A, a schematic of the integration of a plurality of modules 70-1, 70-2 with a second layer 160 is shown. In one form, the modules 70-1, 70-2 include one or more connection elements 150. In one form, the connection elements 150 are configured to electrically couple each of the modules 70-1, 70-2 that are disposed on a first substrate layer to the second layer 160 and thereby electrically couple the various components of the modules 70-1, 70-2 to each other. In one form, the connection elements 150 are provided on the second layer 160. In one form, the second layer 160 is a printed circuit board (PCB) layer.

In one form, the second layer 160 comprises a first distribution network layer 78A, a second distribution network layer 78B, a circuit of the front-end antenna system 1, or a combination thereof. In one form, the circuit of the front-end antenna system 1 includes the beam networks 50, the transceivers 30, or a combination thereof. In one form, the second distribution network layer 78B includes the one or more wave distribution device 88 includes one or more waveguides, one or more transmission lines, one or more dividers, one or more combiners, or a combination thereof. Example wave distribution devices 88 include, but are not limited to: a leaky-wave waveguide, a slotted waveguide (e.g., air-filled waveguides, substrate integrated waveguides, among others), a coplanar waveguide, a cavity-backed waveguide (e.g. air-filled or dielectric-filled with custom shapes), a parallel plate waveguide, a lens structure (a planar lens structure, a Luneburg lens feed network, a Rotman lens, etc.), a Beamforming Matrix structure (e.g., a Butler Matrix, a Hybrid Coupler, a Quadrature Coupler, a Blass Matrix, a Beamswitch Matrix, etc.), a microstrip structure, a H-Tree structure, or a combination thereof.

Referring to FIGS. 3, 6A-6B, and 7A, the distribution network layer 78, 78A includes wave distribution devices 88 that are configured to distribute the plurality of beams from the RFIC layers 76 to the feed layers 74. In one form, the wave distribution device 88 includes one or more waveguides, one or more transmission lines, one or more dividers, one or more combiners, or a combination thereof. Example wave distribution devices 88 include, but are not limited to: a leaky-wave waveguide, a slotted waveguide (e.g., air-filled waveguides, substrate integrated waveguides, among others), a coplanar waveguide, a cavity-backed waveguide (e.g. air-filled or dielectric-filled with custom shapes), a parallel plate waveguide, a lens structure (a planar lens structure, a Luneburg lens network, a Rotman lens, etc.), a beamforming matrix structure (e.g., a Butler Matrix, a Hybrid Coupler, a Quadrature Coupler, a Blass Matrix, a Beamswitch Matrix, etc.), a microstrip structure, a H-Tree structure, or a combination thereof. As a specific example and as shown in FIG.

Figure 7C:
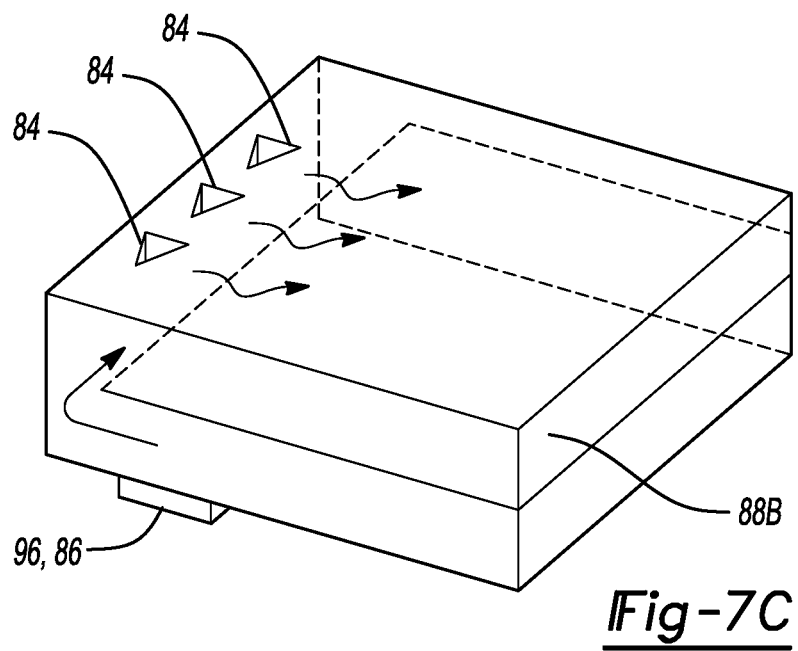
FIG. 7C is a schematic of a distribution network layer of a module of the front-end antenna system according to the teachings of the present disclosure.

7B, the wave distribution device 88 may be a network of one or more rectangular waveguides 88A. As another specific example and as shown in FIG. 7C, the wave distribution device 88 may be a parallel plate waveguide 88B.

Figure 8:
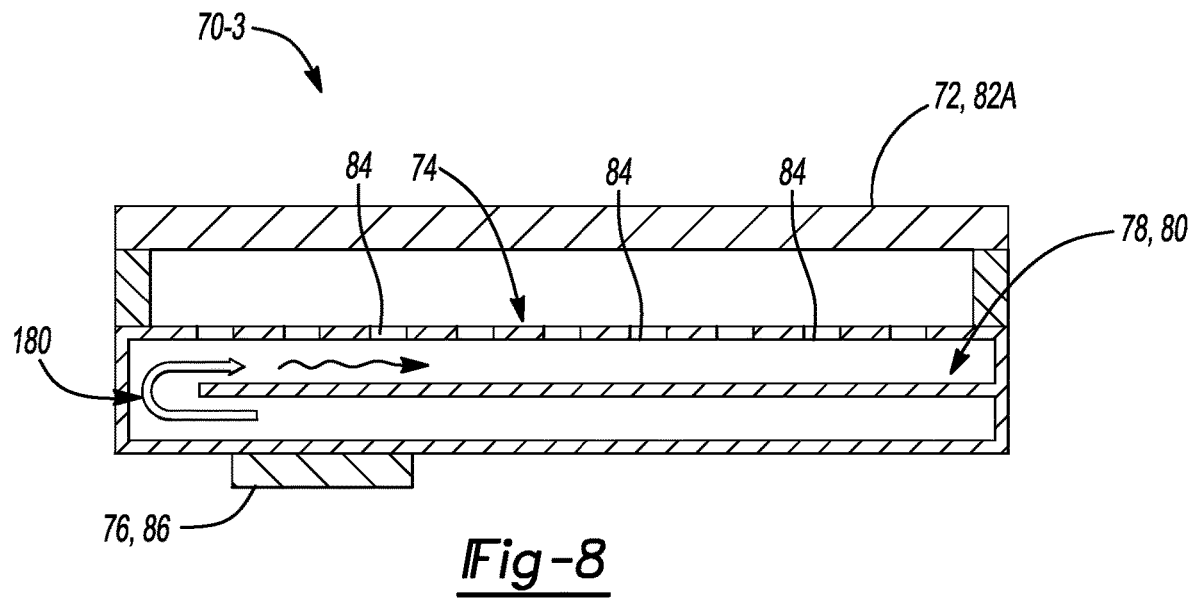
FIG. 8 is a schematic of another example module according to the teachings of the present disclosure.

Referring to FIG. 8, a cross sectional view of another example module 70-3 is shown. In one form, the module 70-3 includes the radiation layer 72, the feed layer 74, the distribution network layer 78, and a transition layer 180. In one form, the radiating elements 82A of the radiation layer 72 include a plurality of metamaterial elements, and the feed elements 84 of the feed layer 74 include a plurality of slot antennas. In one form, the radiation layer 72 and the feed layer 74 are separated by an air gap. In one form, the feed elements 84 are disposed on the wave distribution device 88 (e.g., one of the rectangular waveguide 88A and the parallel plate waveguide 88B). In one form, the distribution network layer 78 and the RFIC 86 of the front-end electronic circuit layer 76 are coupled by the transition layer 180. In one form, the transition layer is a coplanar waveguide (CPW) to waveguide transition, a microstrip to waveguide transition, a planar transition, a 2.5D transition, a stepped transition, a waveguide probe transition, or a combination thereof.

Figure 9:
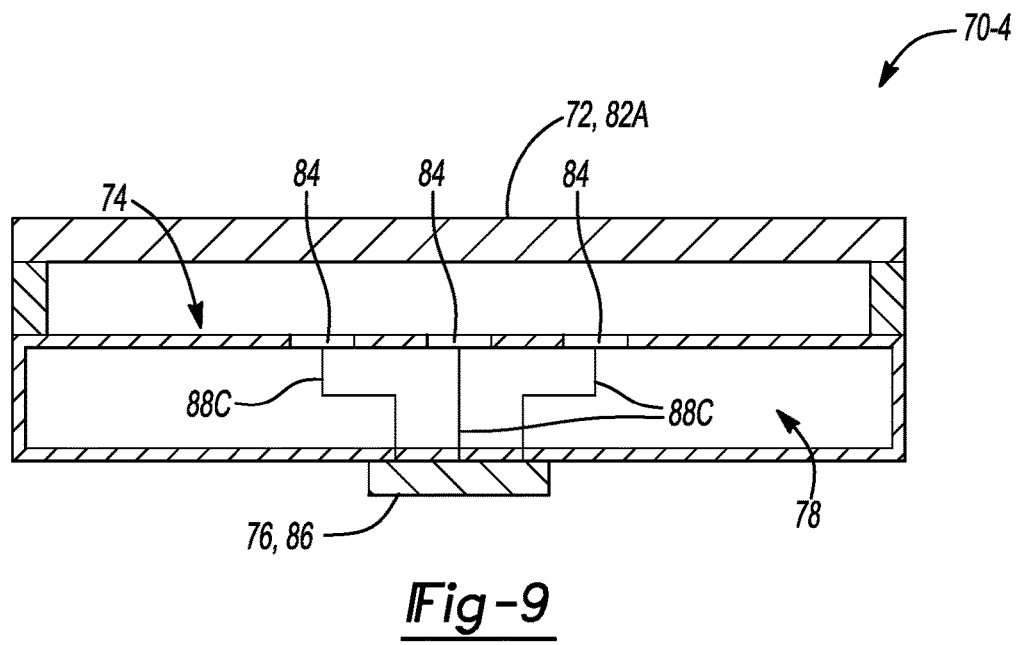
FIG. 9 is a functional block diagram of another example module according to the teachings of the present disclosure.

Referring to FIG. 9, a cross sectional view of another example module 70-4 is shown. In one form, the module 70-4 includes the radiation layer 72, the feed layer 74, and the distribution network layer 78. In one form, the radiating elements 82A of the radiation layer 72 include a plurality of metamaterial elements, and the feed elements 84 of the feed layer 74 include a plurality of planar antennas, microstrip antennas, wire antennas, slot antennas, 2.5D-shaped antennas, 3D-shaped antennas, air-filled antennas, dielectric antennas, aperture antennas, etc. In one form, the radiation layer 72 and the feed layer 74 are separated by an air gap. In one form, the feed elements 84 are electrically coupled to the one or more circuits 86 of the front-end electronic circuit layer 76 via a transmission line 88C (as the wave distribution device 88) of the distribution network layer 78.

Figure 10:
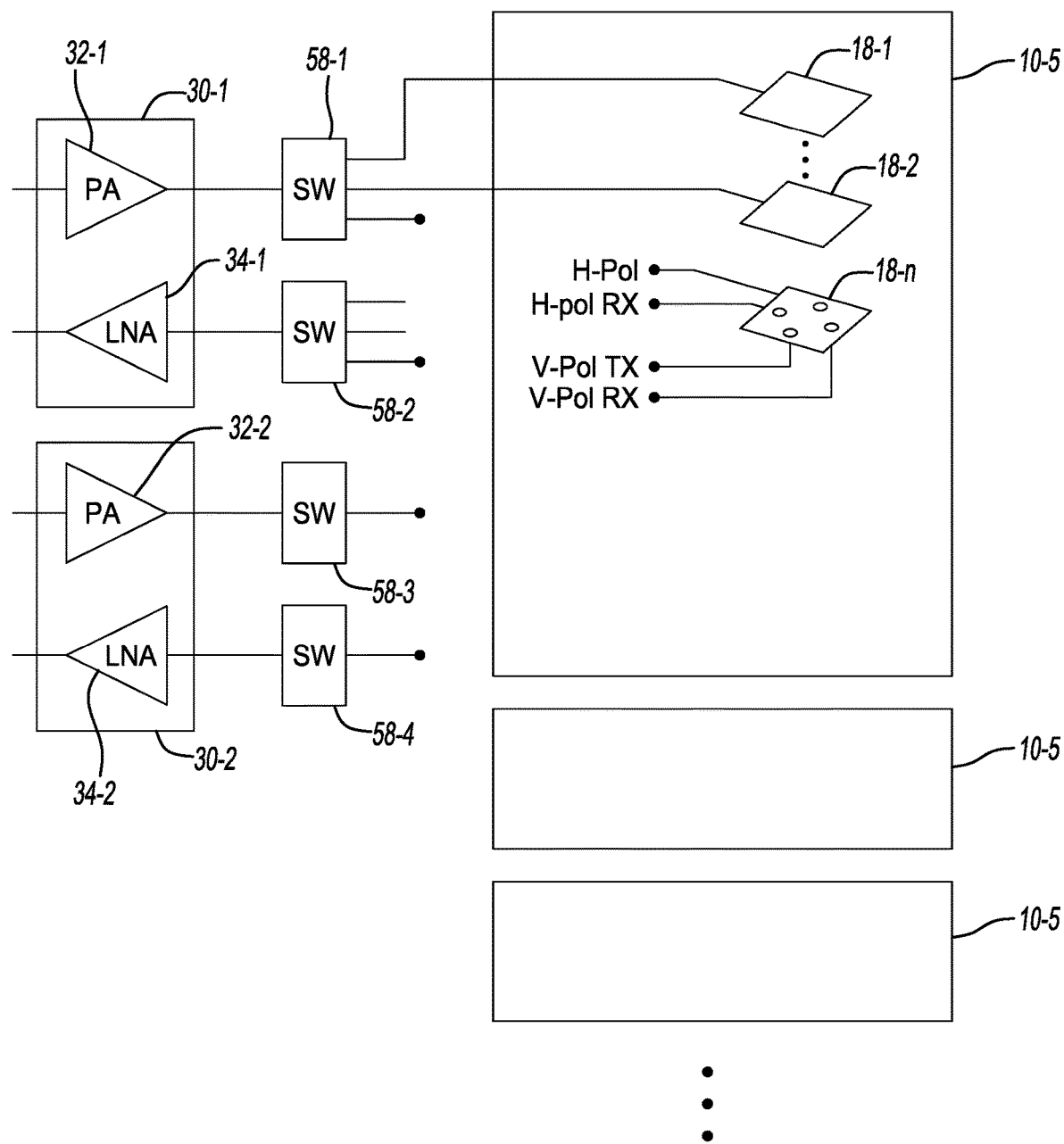
FIG. 10 is a functional block diagram of a front-end antenna system that is configured to operate in a full duplex mode according to the teachings of the present disclosure.

Referring to FIG. 10, a functional block diagram of the front-end antenna system 1 that is operating in a multibeam mode is shown. In one form, each antenna 10-5 includes one or more ports 18-1, 18-2, . . . 18-n (collectively referred to as "the ports 18"), and each of the ports 18 is coupled to a set of the switching networks 58 (e.g., switching networks 58-1, 58-2, 58-3, 58-4). In one form, the set of switching networks 58 is connected to a set of the transceivers 30, which may include a first transceiver 30-1 that includes power amplifier 32-1 and low noise amplifier 34-1 and a second transceiver 30-2 that includes power amplifier 32-2 and low noise amplifier 34-2. In one form, each port 18 of the antenna 10-5 is connected to a set of the transceivers 30 in a full-duplex mode (i.e., simultaneous operation in transmit/receive modes). In this form, the isolation elements 85 may be provided (not shown in FIG. 10) to isolate the transmit and receive ports of the antenna 10, the transmit and receive chains of the antenna 10, or a combination thereof.

In one form, the beamformer networks 51 (not shown in FIG. 10), the switching network 58-1, and the power amplifier 32-1 are configured to control, for each port 18 of each antenna 10-5 of the front-end antenna system 1, a transmission horizontal polarization of the beams. In one form, the beamformer networks 50, the switching network 58-3, and the power amplifier 32-2 are configured to control, for each port 18 of each antenna 10-5 of the front-end antenna system 1, a transmission vertical polarization of the beams. In one form, the beamformer networks 50, the switching network 58-2, and the low noise amplifier 34-1 are configured to control, for each port 18 of each antenna 10-5 of the front-end antenna system 1, a receive horizontal polarization of the beams. In one form, the beamformer networks 50, the switching network 58-4, and the low noise amplifier 34-2 are configured to control, for each port 18 of each antenna 10-5 of the front-end antenna system 1, a receive vertical polarization of the beams. It should be understood that the switching network 58-3, the power amplifier 32-2, the low noise amplifier 34-3, the antennas 10-5, and the ports 18 may be configured for a circular polarization, an elliptical polarization, a linear polarization, or combination thereof.

Figure 11:
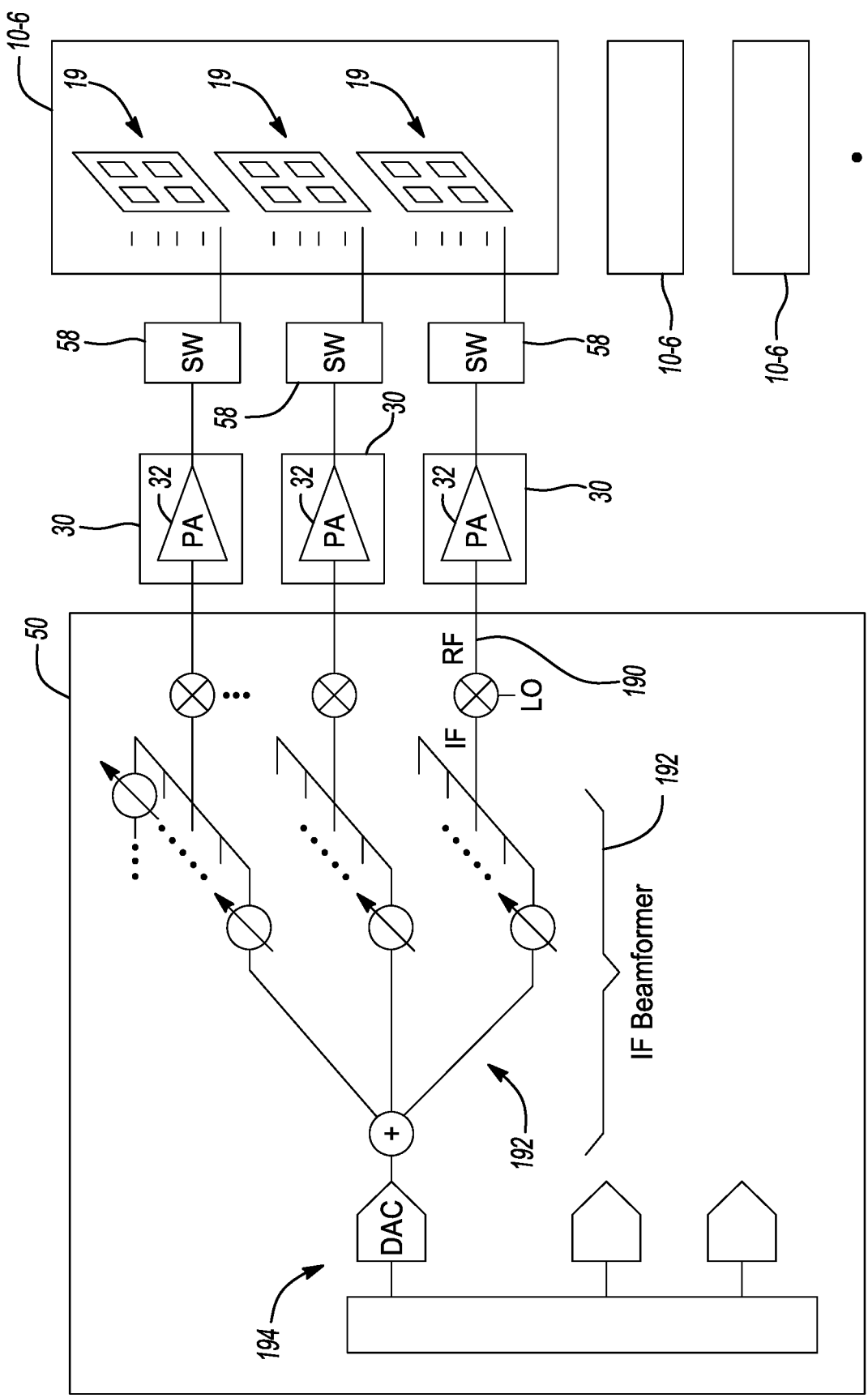
FIG. 11 is a functional block diagram of a front-end antenna system having a multiport antenna that is configured to operate in a full duplex mode according to the teachings of the present disclosure.

Referring to FIG. 11, a functional block diagram of the front-end antenna system 1 that includes a plurality of multiport antennas 10-6 and that operates in a full duplex mode is shown. As described above and as shown in FIG. 11, the beamformer networks 50 and/or components thereof may be implemented at various stages, including an RF stage 190, an intermediate frequency (IF) stage 192, and/or a digital stage 194. The functional block diagram of FIG. 11 is similar to the functional block diagram illustrated in FIG. 10, but in this form, each multiport antenna 10-6 includes a plurality of ports 19, where each port 19 may transmit and/or receive a plurality of beams of a same polarization, a same frequency band, a same modulation, or a combination thereof. Furthermore, in this form, each port 19 is coupled to one of the switching networks 58 and one of the transceivers 30.

Figure 12A:
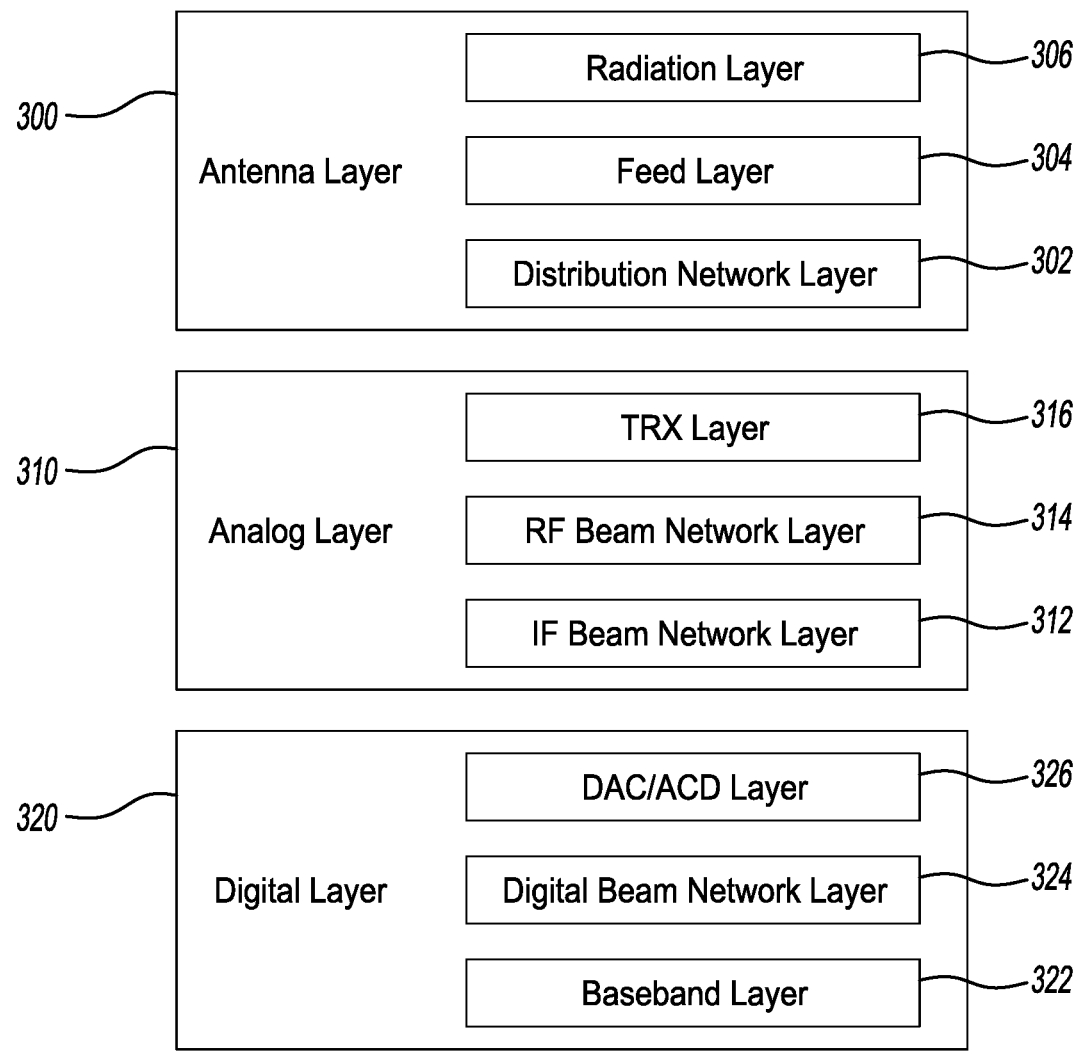
FIG. 12A is a functional block diagram of a front-end antenna system according to the teachings of the present disclosure.

Referring to FIG. 12A, an example functional block diagram of the front-end antenna system 1 configured to perform hybrid beam network processing is shown. In one form, the layers of the functional block diagram correspond to various stages/functionality of the front-end antenna system 1. While the layers are shown individually, it should be understood that any one of the layers may be combined with each other in other forms and is not limited to the arrangement described herein.

In one form, the antenna system 1 includes an antenna layer 300, an analog layer 310, and a digital layer 320. In one form, the antenna layer 300 includes a distribution layer 302, an antenna feed layer 304, and a radiation layer 306 of the antennas 10. In one form, the analog layer 310 includes an IF beam network layer 312, an RF beam network layer 314, and a TRX layer 316 for performing the functionality described herein. In one form, the digital layer 320 includes a baseband layer 322 for performing baseband processing, a digital beam network layer 324, and a DAC/ADC layer 326 for performing the analog-digital/digital-analog conversions. It should be understood that the digital layer 320 may include modems and other digital system components. In one form, the separation of the analog and digital grouping may provide for the integration of the analog circuitry and blocks on a single die, or a set of dies, with the same technology node.

Figure 12B:
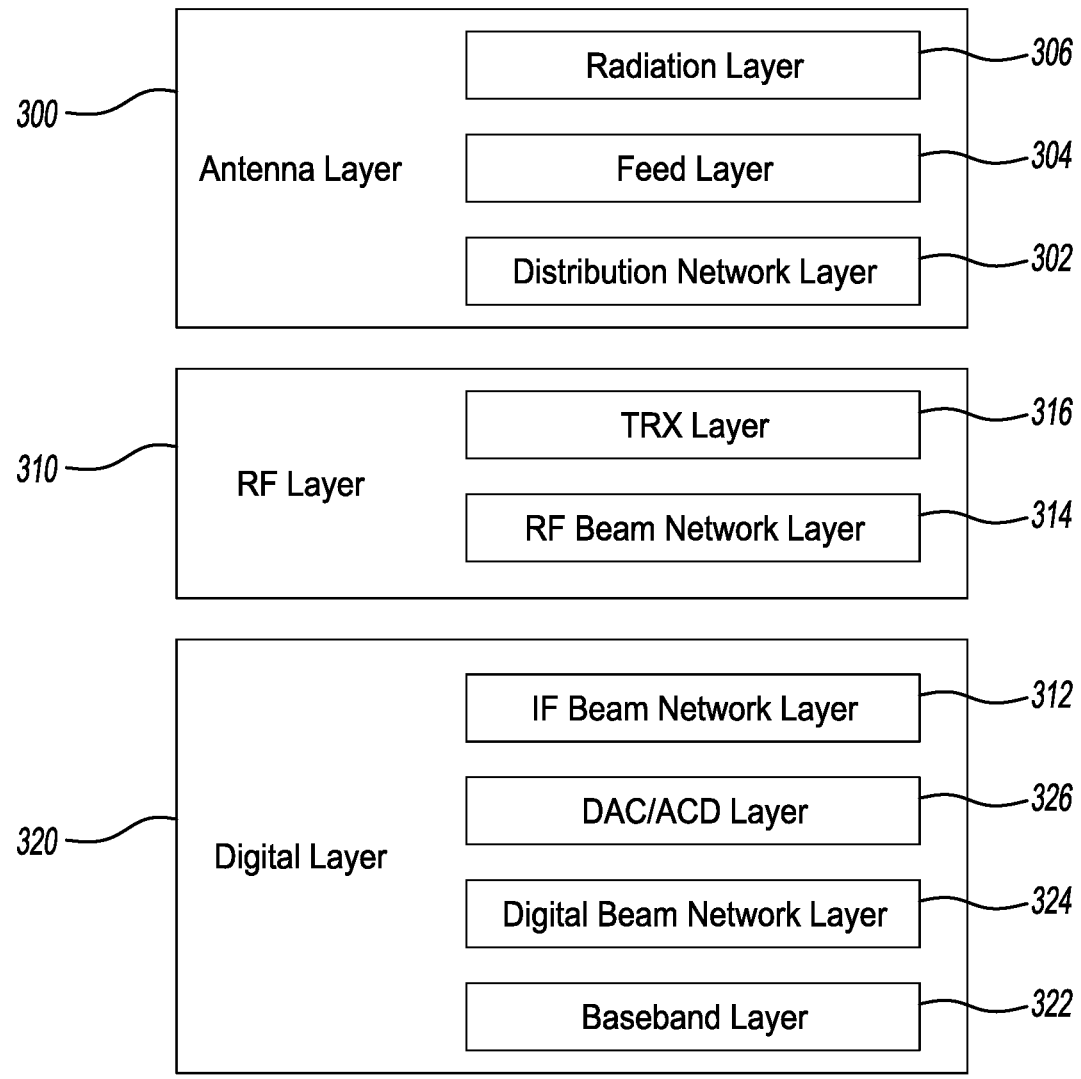
FIG. 12B is a functional block diagram of another front-end antenna system according to the teachings of the present disclosure.

Referring to FIG. 12B, another example functional block diagram of the front-end antenna systems 1 is shown. The functional block diagram illustrated in FIG. 12B is similar to the functional block diagram illustrated in FIG. 12A, except that the IF beam network layer 312 is provided within the digital layer 320.

Figure 12C:
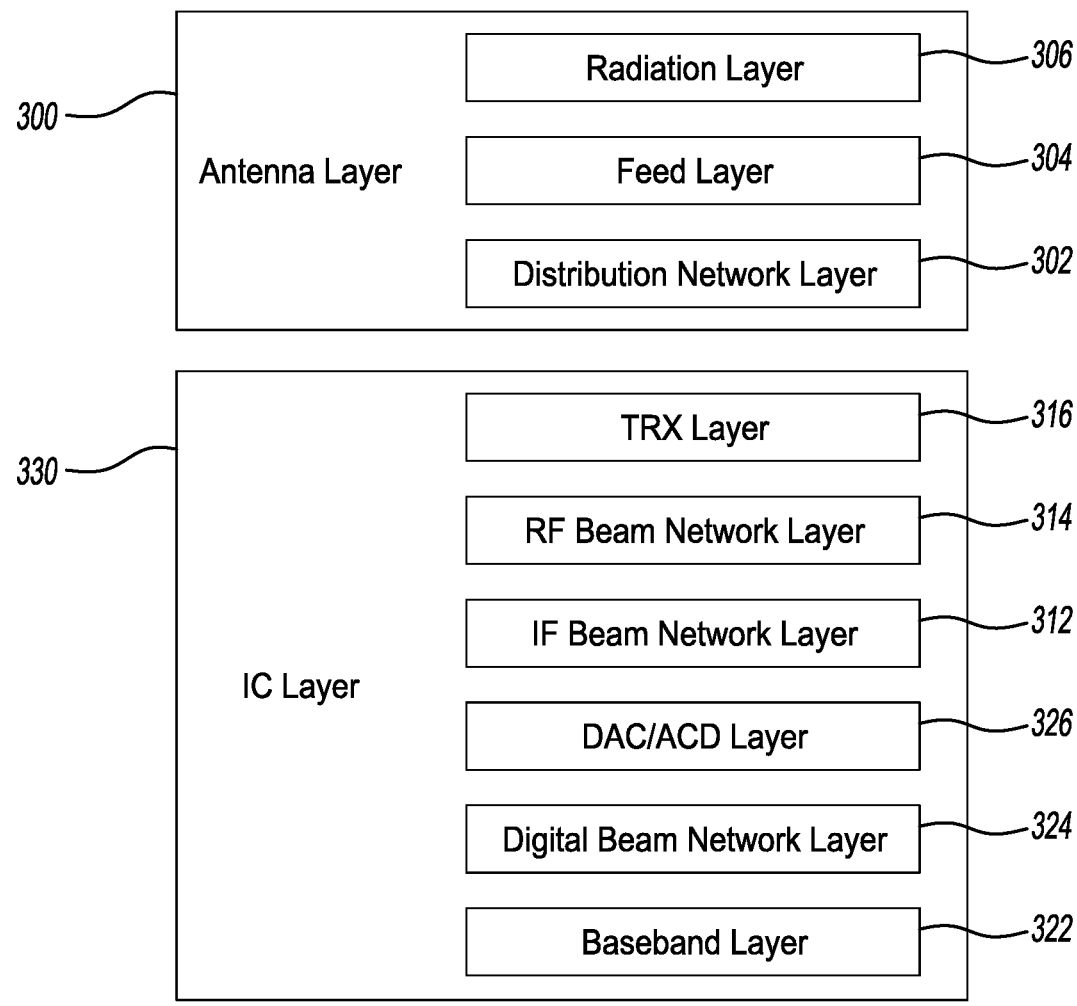
FIG. 12C is a functional block diagram of yet another front-end antenna system according to the teachings of the present disclosure.

Referring to FIG. 12C, an additional example functional block diagram of the front-end antenna systems 1 is shown. The functional block diagram illustrated in FIG. 12C is similar to the functional block diagram illustrated in FIGS. 12A-12B, except that the RF layer 310 and the digital layer 320 are provided within an integrated circuit layer 330.

In one form, the antenna layer 300, the analog layer 310, the digital layer 320, and/or the integrated circuit layer 330 may be provided on and/or include a PCB; 3D or 2.5D molded and/or machined structures; dielectric, metal, and/or air-filled structures and materials; passive and or active electronic devices (e.g. varactors, diodes, transistors, thin-film transistors (TFT), etc.), tunable materials (e.g. BST-based materials, liquid crystal, etc.), and or structures; among others. In one form, the antenna layer 300, the analog layer 310, the digital layer 320, and/or the integrated circuit layer 330 may be provided on and/or include of RFICs, Application-Specific Integrated Circuit (ASICs), SoCs, and/or a set of such blocks (among other blocks, components, connecting lines, etc.) integrated on the PCB.

Figure 13:
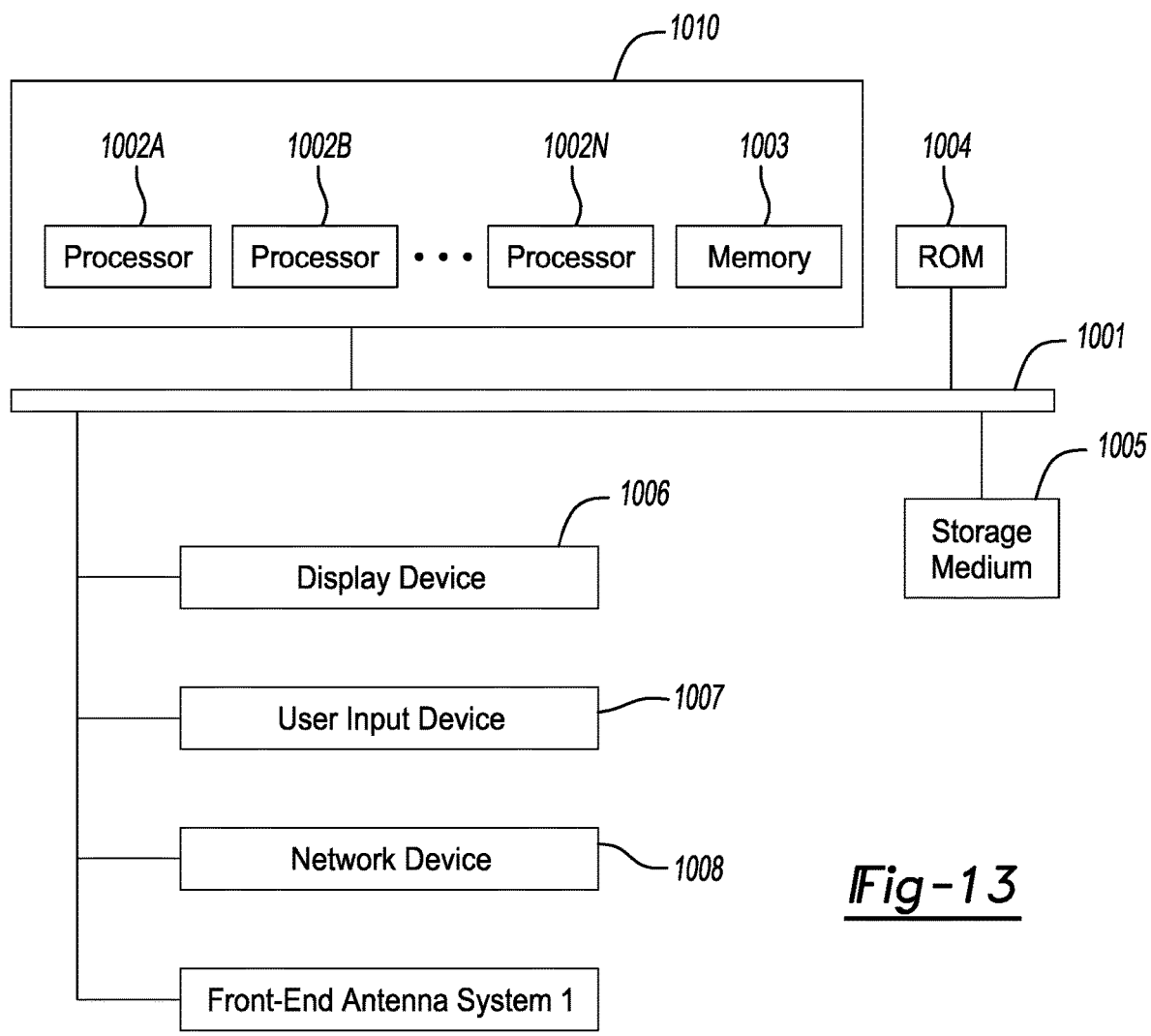
FIG. 13 is a functional block diagram of a front-end antenna system and a controller according to the teachings of the present disclosure.

Referring to FIG. 13, an example computer architecture diagram of one implementation of a computing system 1000 and the front-end antenna system 1 is shown. In some implementations, the computing system 1000 is implemented in a plurality of devices communicably coupled via a communication channel and/or network. In some forms, the components of the computing system 1000 are implemented in separate computing and or sensor devices. In some forms, two or more components of the computing system 1000 are implemented in the same devices. The computing system 1000 and portions thereof may be integrated into a computing and/or wireless device.

In one form, a communication channel 1001 interfaces with processors 1002A-1002N, a memory component (e.g., a random-access memory (RAM)) 1003, a read-only memory (ROM) 1004, and/or a processor-readable storage medium 1005), a display device 1006, a user input device 1007, a network device 1008, the front-end antenna systems 1 described herein, and/or other suitable computing devices.

In one form, the processors 1002A-1002N may include central processing units (CPUs), graphical processing units (GPUs), microprocessors, machine learning/deep learning (ML/DL) processing units (e.g., a tensor processing unit), FPGA (Field Programmable Gate Arrays, custom processors, and/or any suitable type of processor.

In one form, the processors 1002A-1002N and the memory components 1003 collectively form a processing unit 1010. In some embodiments, the processing unit 1010 includes one or more processors communicably coupled to one or more of the memory components 1003, the ROM 1004, and the processor-readable storage medium 1005 via a bus to execute instructions stored therein. In one form, the processing unit 1010 is an ASIC, SoC, or combination thereof.

In one form, the network device 1008 provides one or more wired or wireless interfaces for exchanging information between the computing system 1000 and/or other devices, such as external devices. Example network devices 1008 include, but are not limited to: a universal serial bus (USB) interface, a BLUETOOTH interface, wireless fidelity (Wi-Fi) interface, an Ethernet interface, a near field communication (NFC) interface, a cellular interface, among others.

In one form, the processor-readable storage medium 1005 is a hard drive, a flash drive, a DVD, a CD, an optical disk, a floppy disk, a flash storage, a solid-state drive, a ROM, an EEPROM, an electronic circuit, a semiconductor memory device, or a combination thereof. The processor-readable storage medium 1005 may include an operating system, software programs, device drivers, and/or other suitable sub-systems or software.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase "at least one of A, B, and C" and "a combination thereof" should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An antenna system configured to transmit or receive one or more beams in one or more spatial regions from among a plurality of spatial regions, the antenna system comprising:
   a module electrically coupled to a front-end electronic circuit layer configured to process the one or more beams, the module comprising:
      a radiation layer comprising one or more radiating elements configured to at least one of transmit and receive the one or more beams;
      a feed layer comprising one or more feed elements, wherein the one or more feed elements are configured to excite the radiation layer, transmit the one or more beams, receive the one or more beams, or a combination thereof, wherein the one or more feed elements include a planar antenna, a 2.5D-shaped antenna, a 3D-shaped antenna, an active antenna, a passive antenna, a single port antenna, a multiport antenna, an air-filled antenna, a dielectric-filled antenna, or a combination thereof; and a distribution network layer comprising a wave distribution device, wherein the wave distribution device is configured to distribute the one or more beams from the front-end electronic circuit layer to the feed layer.

2. The antenna system of claim 1, wherein the radiation layer includes a pixelated antenna aperture, a continuous antenna aperture, a planar antenna aperture, a conformal antenna aperture, a fixed antenna aperture, a tunable antenna aperture, a passive antenna aperture, a transmissive antenna aperture, a reflective antenna aperture, or a combination thereof.

3. The antenna system of claim 1, wherein the radiation layer comprises one or more metamaterial elements configured to at least one of transmit and receive the one or more beams, wherein the feed layer is configured to excite the one or more metamaterial elements to at least one of transmit and receive the one or more beams.

4. The antenna system of claim 1, wherein:
the radiation layer includes a tunable antenna aperture;
the plurality of radiating elements comprise a modification device configured to modify a phase of a signal, an amplitude of the signal, a polarization of the signal, a modulation of the signal, or a combination thereof; and
the modification device comprises a tunable device, an active device, a passive device, or a combination thereof.

5. The antenna of claim 1, wherein:
the one or more radiating elements comprise at least two layers; and
each layer from among the at least two layers comprises a dielectric substrate, an air-filled substrate, a patterned metal layer, a cavity-backed structure, a tunable device, an active device, or a combination thereof.

6. The antenna system of claim 1, wherein the wave distribution device is a network of one or more waveguides, a network of one or more transmission lines, a network of one or more dividers, a network of one or more combiners, a network of beamformers, a network of lens structures, a network of beamforming matrix structures, or a combination thereof.

7. The antenna system of claim 6, wherein the one or more waveguides include a leaky-wave waveguide, a slotted waveguide, a coplanar waveguide, a cavity-backed waveguide, a parallel plate waveguide, or a combination thereof.

8. A front-end antenna system comprising a controller and the antenna system of claim 1, wherein the controller is configured to control the antenna system to transmit the one or more beams, receive the one or more beams, or a combination thereof based on radiation parameters.

9. The front-end antenna system of claim 8 further comprising a plurality of beam networks and a plurality of transceivers, wherein each beam network from among the plurality of beam networks includes a plurality of beamforming circuits, a plurality of switching circuits, or a combination thereof, and wherein:
each feed element from among the one or more feed elements includes one or more ports;
each port from among the one or more ports is electrically coupled to one or more beam networks from among the plurality of beam networks; and each beam network from among the plurality of beam networks corresponds to one of a transmission polarization and a receive polarization.

10. The antenna system of claim 1, wherein:
each module from among the one or more modules is provided on a first substrate layer;
each module from among the one or more modules is electrically coupled to a second substrate layer via a plurality of connectors; and
wherein the second layer comprising one or more signal distribution networks, one or more circuits, or a combination thereof to electrically couple the one or more modules together.

11. The antenna system of claim 1, wherein the module is configured to simultaneously transmit and receive one or more signal streams over the one or more beams.

12. The antenna system of claim 1, wherein:
the feed layer further comprises an isolation element configured to isolate a set of feed elements from among the one or more feed elements; and
the isolation element comprises a plurality of vias, an artificial boundary plane, a shield, a ground plane, a parasitic element, a cavity structure, a filter network, a cancellation network, or a combination thereof.

13. The antenna system of claim 12, wherein:
each feed element from among the set of feed elements is operable in a transmit mode, a receive mode, or a combination thereof; and
the set of feed elements includes one feed element when each feed element from among the set of feed elements is operable in both the transmit mode and the receive mode.

14. The antenna system of claim 12, wherein:
the set of feed elements includes two or more feed elements when each feed element from among the set of feed elements is operable in one of a transmit mode and a receive mode; and
the two or more feed elements have one of a planar arrangement and a non-planar arrangement.

15. The antenna system of claim 1, wherein:
the feed layer further comprises an isolation element configured to isolate a set of feed elements from among the one or more feed elements;
the isolation element comprises a cancellation network configured to sample a transmitted signal for a set of ports of the set of feed elements, a set of signal streams of the set of feed elements, or a combination thereof; and
for a transmitted signal, the isolation element is configured to inject a secondary signal into a receive signal chain, wherein the secondary signal is configured to inhibit an interference of the transmitted signal on the receive signal chain.

16. The antenna system of claim 15, wherein:
the cancellation network comprises one or more signal splitters, one or more filter circuits, one or more delay elements, one or more attenuators, one or more combiners, or a combination thereof; and
each component of the cancellation network is provided at a radio frequency (RF) stage, an intermediate frequency (IF) stage, a digital stage, a local oscillator (LO) stage, or a combination thereof.

17. A front-end antenna system comprising a plurality of beam networks, a plurality of transceivers, and the antenna system of claim 16, wherein:

the cancellation network is provided on an integrated circuit chip and includes at least one tunable component; and one or more portions of the cancellation network are provided at the plurality of beam networks, the plurality of transceivers, or a combination thereof.

18. An antenna system configured to output one or more beams in one or more spatial regions from among a plurality of spatial regions, the antenna system comprising:
a module electrically coupled to a front-end electronic circuit layer configured to process the one or more beams, the module configured to simultaneously transmit and receive one or more signal streams over the one or more beams, the module comprising:
a radiation layer comprising one or more radiating elements configured to at least one of transmit and receive the one or more beams;
a feed layer comprising one or more feed elements, wherein the one or more feed elements are configured to excite the radiation layer, transmit the one or more beams, receive the one or more beams, or a combination thereof, wherein the feed layer further comprises an isolation element configured to isolate a set of feed elements from among the one or more feed elements; and
a distribution network layer comprising a wave distribution device, wherein the wave distribution device is configured to distribute the one or more beams from the front-end electronic circuit layer to the feed layer.

19. The antenna system of claim 18, wherein:
the isolation element comprises a plurality of vias, an artificial boundary plane, a shield, a ground plane, a parasitic element, a filter network, a cavity structure, a cancellation network, or a combination thereof.

20. The antenna system of claim 18, wherein the one or more feed elements include a planar antenna, a 2.5D-shaped antenna, a 3D-shaped antenna, an active antenna, a passive antenna, a single port antenna, a multiport antenna, an air-filled antenna, a dielectric-filled antenna, or a combination thereof.

21. The antenna system of claim 18, wherein:
each feed element from among the set of feed elements is operable in a transmit mode, a receive mode, or a combination thereof; and
the set of feed elements includes one feed element when each feed element from among the set of feed elements is operable in both the transmit mode and the receive mode.

22. The antenna system of claim 18, wherein:
the set of feed elements includes two or more feed elements when each feed element from among the set of feed elements is operable in one of a transmit mode and a receive mode; and
the two or more feed elements have one of a planar arrangement and a non-planar arrangement.

23. The antenna system of claim 18, wherein:
the isolation element comprises a cancellation network configured to sample a transmitted signal for a set of ports of the set of feed elements, a set of signal streams of the set of feed elements, or a combination thereof; and
for a transmitted signal, the isolation element is configured to inject a secondary signal into a receive signal chain, wherein the secondary signal is configured to inhibit an interference of the transmitted signal on the receive signal chain.

24. The antenna system of claim 23, wherein:
the cancellation network comprises one or more signal splitters, one or more filter circuits, one or more delay elements, one or more attenuators, one or more combiners, or a combination thereof; and
each component of the cancellation network is provided at a radio frequency (RF) stage, an intermediate frequency (IF) stage, a digital stage, a local oscillator (LO) stage, or a combination thereof.

25. A front-end antenna system comprising a plurality of beam networks, a plurality of transceivers, and the antenna system of claim 23, wherein:
the cancellation network is provided on an integrated circuit chip and includes at least one tunable component; and
one or more portions of the cancellation network are provided at the plurality of beam networks, the plurality of transceivers, or a combination thereof.

26. An antenna system configured to output one or more beams in one or more spatial regions from among a plurality of spatial regions, the antenna system comprising:
a module electrically coupled to a front-end electronic circuit layer configured to process the one or more beams, the module configured to simultaneously transmit and receive one or more signal streams over the one or more beams, the module comprising:
a radiation layer comprising one or more radiating elements configured to at least one of transmit and receive the one or more beams, wherein the radiation layer includes a pixelated antenna aperture, a continuous antenna aperture, a planar antenna aperture, a conformal antenna aperture, a fixed antenna aperture, a tunable antenna aperture, a passive antenna aperture, a transmissive antenna aperture, a reflective antenna aperture, a plurality of metamaterial elements, or a combination thereof;
a feed layer comprising one or more feed elements, wherein:
the one or more feed elements are configured to excite the radiation layer, transmit the one or more beams, receive the one or more beams, or a combination thereof;
the one or more feed elements include a planar antenna, a 2.5D-shaped antenna, a 3D-shaped antenna, an active antenna, a passive antenna, a single port antenna, a multiport antenna, an air-filled antenna, a dielectric-filled antenna, or a combination thereof; and
the feed layer includes an isolation element configured to isolate a set of feed elements from among the one or more feed elements; and
a distribution network layer comprising a wave distribution device, wherein the wave distribution device is configured to distribute the one or more beams from the circuit layer to the feed layer, and wherein the wave distribution device is a network of one or more waveguides, a network of one or more transmission lines, a network of one or more dividers, a network of one or more combiners, or a combination thereof.

* * * * *